United States Patent
Venkataraman et al.

(10) Patent No.: US 11,368,662 B2
(45) Date of Patent: Jun. 21, 2022

(54) MULTI-BASELINE CAMERA ARRAY SYSTEM ARCHITECTURES FOR DEPTH AUGMENTATION IN VR/AR APPLICATIONS

(71) Applicant: FotoNation Limited, Galway (IE)

(72) Inventors: Kartik Venkataraman, San Jose, CA (US); Dan Lelescu, Morgan Hill, CA (US); Jacques Duparre, Jena (DE)

(73) Assignee: FotoNation Limited

( * ) Notice: Subject to any disclaimer, the term of this patent is extended or adjusted under 35 U.S.C. 154(b) by 0 days.

(21) Appl. No.: 17/068,243

(22) Filed: Oct. 12, 2020

(65) Prior Publication Data

US 2021/0044790 A1  Feb. 11, 2021

Related U.S. Application Data

(62) Division of application No. 15/133,186, filed on Apr. 19, 2016, now Pat. No. 10,805,589.

(Continued)

(51) Int. Cl.
*H04N 13/02* (2006.01)
*H04N 13/128* (2018.01)
(Continued)

(52) U.S. Cl.
CPC ........... *H04N 13/128* (2018.05); *G01C 11/06* (2013.01); *G02B 27/017* (2013.01); *G02B 27/0172* (2013.01); *G06T 7/593* (2017.01); *H04N 5/2258* (2013.01); *H04N 5/247* (2013.01); *H04N 13/243* (2018.05); *H04N 13/271* (2018.05); *G02B 2027/014* (2013.01);
(Continued)

(58) Field of Classification Search
CPC ............................ H04N 13/128; G02B 27/017
See application file for complete search history.

(56) References Cited

U.S. PATENT DOCUMENTS

| | | |
|---|---|---|
| 5,005,083 A | 4/1991 | Grage et al. |
| 5,703,961 A | 12/1997 | Rogina et al. |

(Continued)

FOREIGN PATENT DOCUMENTS

| | | |
|---|---|---|
| CN | 1727991 A | 2/2006 |
| CN | 101785025 A | 7/2010 |

(Continued)

OTHER PUBLICATIONS

Extended European Search Report for European Application No. 16783702.0, Search completed Oct. 10, 2018, dated Oct. 18, 2018 12 pgs.

(Continued)

*Primary Examiner* — Fabio S Lima
(74) *Attorney, Agent, or Firm* — KPPB LLP

(57) ABSTRACT

Embodiments of the invention provide a camera array imaging architecture that computes depth maps for objects within a scene captured by the cameras, and use a near-field sub-array of cameras to compute depth to near-field objects and a far-field sub-array of cameras to compute depth to far-field objects. In particular, a baseline distance between cameras in the near-field subarray is less than a baseline distance between cameras in the far-field sub-array in order to increase the accuracy of the depth map. Some embodiments provide an illumination near-IR light source for use in computing depth maps.

19 Claims, 23 Drawing Sheets

Related U.S. Application Data

(60) Provisional application No. 62/149,636, filed on Apr. 19, 2015.

(51) Int. Cl.

| | | |
|---|---|---|
| *H04N 5/247* | (2006.01) | |
| *G02B 27/01* | (2006.01) | |
| *H04N 13/271* | (2018.01) | |
| *G06T 7/593* | (2017.01) | |
| *H04N 5/225* | (2006.01) | |
| *H04N 13/243* | (2018.01) | |
| *G01C 11/06* | (2006.01) | |
| *H04N 5/33* | (2006.01) | |
| *H04N 5/222* | (2006.01) | |
| *H04N 13/00* | (2018.01) | |

(52) U.S. Cl.
CPC .............. *G02B 2027/0136* (2013.01); *G02B 2027/0138* (2013.01); *G06T 2207/10012* (2013.01); *G06T 2207/10028* (2013.01); *G06T 2207/20016* (2013.01); *H04N 5/2226* (2013.01); *H04N 5/2256* (2013.01); *H04N 5/332* (2013.01); *H04N 2013/0081* (2013.01)

(56) References Cited

U.S. PATENT DOCUMENTS

| | | | |
|---|---|---|---|
| 6,084,979 | A | 7/2000 | Kanade et al. |
| 6,185,529 | B1 | 2/2001 | Chen et al. |
| 6,765,617 | B1 | 7/2004 | Tangen et al. |
| 7,965,314 | B1 | 6/2011 | Miller et al. |
| 8,044,994 | B2 | 10/2011 | Vetro et al. |
| 8,289,440 | B2 | 10/2012 | Pitts et al. |
| 8,619,082 | B1 | 12/2013 | Ciurea et al. |
| 8,831,367 | B2 | 9/2014 | Venkataraman et al. |
| 8,854,433 | B1 | 10/2014 | Rafii |
| 8,902,321 | B2 | 12/2014 | Venkataraman et al. |
| 9,025,895 | B2 | 5/2015 | Venkataraman et al. |
| 9,036,931 | B2 | 5/2015 | Venkataraman et al. |
| 9,047,684 | B2 | 6/2015 | Lelescu et al. |
| 9,077,893 | B2 | 7/2015 | Venkataraman et al. |
| 9,191,580 | B2 | 11/2015 | Venkataraman et al. |
| 9,264,592 | B2 | 2/2016 | Rodda et al. |
| 10,805,589 | B2 | 10/2020 | Venkataraman et al. |
| 2002/0028014 | A1 | 3/2002 | Ono |
| 2002/0120634 | A1 | 8/2002 | Min et al. |
| 2002/0195548 | A1 | 12/2002 | Dowski, Jr. et al. |
| 2004/0003409 | A1 | 1/2004 | Berstis |
| 2004/0061787 | A1 | 4/2004 | Liu et al. |
| 2004/0141659 | A1 | 7/2004 | Zhang |
| 2004/0179008 | A1 | 9/2004 | Gordon et al. |
| 2005/0117015 | A1 | 6/2005 | Cutler |
| 2005/0203380 | A1 | 9/2005 | Sauer et al. |
| 2006/0018509 | A1 | 1/2006 | Miyoshi |
| 2006/0029271 | A1 | 2/2006 | Miyoshi et al. |
| 2006/0203100 | A1 | 9/2006 | Ajito et al. |
| 2006/0221250 | A1 | 10/2006 | Rossbach et al. |
| 2006/0289772 | A1 | 12/2006 | Johnson et al. |
| 2007/0201859 | A1 | 8/2007 | Sarrat |
| 2008/0030592 | A1 | 2/2008 | Border et al. |
| 2008/0030597 | A1 | 2/2008 | Olsen et al. |
| 2008/0106620 | A1 | 5/2008 | Sawachi |
| 2008/0131019 | A1 | 6/2008 | Ng |
| 2008/0165257 | A1 | 7/2008 | Boettiger |
| 2008/0218612 | A1 | 9/2008 | Border et al. |
| 2008/0278610 | A1 | 11/2008 | Boettiger |
| 2009/0027543 | A1 | 1/2009 | Kanehiro |
| 2009/0128644 | A1 | 5/2009 | Camp, Jr. et al. |
| 2010/0007714 | A1 | 1/2010 | Kim et al. |
| 2010/0097444 | A1 | 4/2010 | Lablans |
| 2010/0238327 | A1 | 9/2010 | Griffith et al. |
| 2010/0265385 | A1 | 10/2010 | Knight et al. |
| 2011/0013006 | A1* | 1/2011 | Uzenbajakava ....... A61B 5/444 348/77 |
| 2011/0069189 | A1 | 3/2011 | Venkataraman et al. |
| 2011/0090217 | A1 | 4/2011 | Mashitani et al. |
| 2011/0129165 | A1 | 6/2011 | Lim et al. |
| 2011/0169994 | A1 | 7/2011 | DiFrancesco et al. |
| 2012/0057040 | A1 | 3/2012 | Park et al. |
| 2012/0127284 | A1 | 5/2012 | Bar-Zeev et al. |
| 2012/0147205 | A1 | 6/2012 | Lelescu et al. |
| 2012/0162374 | A1* | 6/2012 | Markas ................. H04N 13/221 348/46 |
| 2012/0229463 | A1* | 9/2012 | Yeh .......................... G06T 19/00 345/422 |
| 2012/0249853 | A1 | 10/2012 | Krolczyk et al. |
| 2012/0293489 | A1* | 11/2012 | Chen ..................... H04N 13/128 345/419 |
| 2012/0314937 | A1 | 12/2012 | Kim et al. |
| 2013/0038696 | A1 | 2/2013 | Ding et al. |
| 2013/0128049 | A1 | 5/2013 | Schofield et al. |
| 2013/0171623 | A1* | 7/2013 | He ......................... G01N 33/582 435/5 |
| 2013/0278631 | A1 | 10/2013 | Border et al. |
| 2014/0104268 | A1* | 4/2014 | Lipton .................. H04N 13/122 345/419 |
| 2014/0125760 | A1 | 5/2014 | Au et al. |
| 2014/0186045 | A1 | 7/2014 | Poddar et al. |
| 2014/0240528 | A1 | 8/2014 | Venkataraman et al. |
| 2014/0267243 | A1 | 9/2014 | Venkataraman et al. |
| 2014/0267633 | A1 | 9/2014 | Venkataraman et al. |
| 2014/0307058 | A1 | 10/2014 | Kirk et al. |
| 2014/0340539 | A1 | 11/2014 | Venkataraman et al. |
| 2015/0029311 | A1* | 1/2015 | Cheng .................. H04N 13/122 348/46 |
| 2015/0042814 | A1 | 2/2015 | Vaziri |
| 2015/0043808 | A1* | 2/2015 | Takahashi .................. G06T 5/50 382/154 |
| 2015/0049915 | A1* | 2/2015 | Ciurea ..................... G06T 7/557 382/106 |
| 2015/0104101 | A1* | 4/2015 | Bryant ..................... G06T 7/507 382/171 |
| 2015/0124151 | A1 | 5/2015 | Rodda et al. |
| 2015/0222879 | A1* | 8/2015 | Hamachi ................ G06T 5/001 348/47 |
| 2016/0050345 | A1* | 2/2016 | Longbotham ...... G02B 27/0172 348/47 |
| 2016/0209654 | A1 | 7/2016 | Riccomini et al. |
| 2016/0210785 | A1 | 7/2016 | Balachandreswaran et al. |
| 2016/0309134 | A1* | 10/2016 | Venkataraman ..... G02B 27/017 |

FOREIGN PATENT DOCUMENTS

| | | |
|---|---|---|
| CN | 105409212 A | 3/2016 |
| CN | 108307675 A | 7/2018 |
| CN | 108307675 B | 12/2020 |
| EP | 3286914 A1 | 2/2018 |
| EP | 3286914 B1 | 12/2019 |
| JP | 2001008235 A2 | 1/2001 |
| JP | 2001194114 A2 | 7/2001 |
| JP | 2001264033 A2 | 9/2001 |
| JP | 2001337263 A2 | 12/2001 |
| JP | 2003298920 A | 10/2003 |
| JP | 2015022510 A | 2/2015 |
| WO | 2011105814 A2 | 9/2011 |
| WO | 2015048906 A1 | 4/2015 |
| WO | 2016172125 A1 | 10/2016 |
| WO | 2016172125 A9 | 4/2017 |

OTHER PUBLICATIONS

International Preliminary Report on Patentability for International Application PCT/US2016/028317, Report dated Oct. 24, 2017, dated Nov. 2, 2017, 8 Pgs.

International Search Report and Written Opinion for International Application No. PCT/US2016/028317, Search completed Aug. 15, 2016, dated Sep. 1, 2016, 11 Pgs.

"Light fields and computational photography", Stanford Computer Graphics Laboratory, Retrieved from: http://graphics.stanford.edu/projects/lightfield/, Earliest publication online: Feb. 10, 1997, 3 pgs.

(56) References Cited

OTHER PUBLICATIONS

Bishop et al., "Full-Resolution Depth Map Estimation from an Aliased Plenoptic Light Field", ACCV Nov. 8, 2010, Part II, LNCS 6493, pp. 186-200.
Fecker et al., "Depth Map Compression for Unstructured Lumigraph Rendering", Proc. SPIE 6077, Proceedings Visual Communications and Image Processing 2006, Jan. 18, 2006, pp. 60770B-1-60770B-8.
Georgeiv et al., "Light Field Camera Design for Integral View Photography", Adobe Systems Incorporated, Adobe Technical Report, 2003, 13 pgs.
Georgiev et al., "Light-Field Capture by Multiplexing in the Frequency Domain", Adobe Systems Incorporated, Adobe Technical Report, 2003, 13 pgs.
Kubota et al., "Reconstructing Dense Light Field From Array of Multifocus Images for Novel View Synthesis", IEEE Transactions on Image Processing, vol. 16, No. 1, Jan. 2007, pp. 269-279.
Li et al., "Fusing Images With Different Focuses Using Support Vector Machines", IEEE Transactions on Neural Networks, vol. 15, No. 6, Nov. 8, 2004, pp. 1555-1561.
Milella et al., "3D reconstruction and classification of natural environments by an autonomous vehicle using multi-baseline stereo", Intelligent Service Robotics, vol. 7, No. 2, Mar. 2, 2014, pp. 79-92.
Ng et al., "Light Field Photography with a Hand-held Plenoptic Camera", Stanford Tech Report CTSR 2005-02, Apr. 20, 2005, pp. 1-11.
Stober, "Stanford researchers developing 3-D camera with 12,616 lenses", Stanford Report, Mar. 19, 2008, Retrieved from: http://news.stanford.edu/news/2008/march19/camera-031908.html, 5 pgs.
Taguchi et al., "Rendering-Oriented Decoding for a Distributed Multiview Coding System Using a Coset Code", Hindawi Publishing Corporation, EURASIP Journal on Image and Video Processing, vol. 2009, Article ID 251081, Online: Apr. 22, 2009, 12 pages.
Van Der Wal et al., "The Acadia Vision Processor", Proceedings Fifth IEEE International Workshop on Computer Architectures for Machine Perception, Sep. 13, 2000, Padova, Italy, pp. 31-40.
Vetro et al., "Coding Approaches for End-To-End 3D TV Systems", Mitsubishi Electric Research Laboratories, Inc., TR2004-137, Dec. 2004, 6 pgs.
Wieringa et al., "Remote Non-invasive Stereoscopic Imaging of Blood Vessels: First In-vivo Results of a New Multispectral Contrast Enhancement Technology", Annals of Biomedical Engineering, vol. 34, No. 12, Dec. 2006, pp. 1870-1878, Published online Oct. 12, 2006.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 1-12.
Xu, "Real-Time Realistic Rendering and High Dynamic Range Image Display and Compression", Dissertation, School of Computer Science in the College of Engineering and Computer Science at the University of Central Florida, Orlando, Florida, Fall Term 2005, 192 pgs.

\* cited by examiner

Table 1: Key AR/VR Specifications for Depth Imaging System

| No. | Requirements | Value | Note |
|---|---|---|---|
| 1. | FOV (H x V x D) (deg) | 90 x 70 x 114 | Maximum desired FOV (in working range 0.15m – 1.0m) |
| 2. | FOV (H x V x D) (deg) | 72 x 54 x 90 | Minimum desired FOV (in working range 0.15m – 1.0m) |
| 3. | Minimum Working Range | 0.15m | |
| 4. | Maximum Working Range | 4.0m | White wall (80% diffuse reflectivity) |
| 5. | Depth Resolution | [160,120] ↔ [640, 480] | In pixels |
| 6. | Depth Accuracy | <1% over working range | |
| 7. | Multi-users | Multiple depth sensors imaging same area with no crosstalk | |
| 8. | Ambient Light | Insensitive to ambient lighting conditions | |
| 9. | Operating Power | <500mW | Sensor + Compute + IR Illumination |
| 10. | Allocated Volume | See Figure 1 | Keep-in Volumes |

FIG. 3

Table 2: Depth Accuracy Table as a Function of Object Distance for Imaging System

FIG. 5

Summary of Operational Configurations
and Expected HW and SW Efficiencies

| Mode | # of Cameras | # of MIPI Lanes on MV2 |
|---|---|---|
| 1 | 6/5<br>4 VGA (70° DFOV) +<br>2 720P (90° DFOV) | 4 Data + 3 Clk<br>(with MIPI Bridge Chip) |
| 2 | 4<br>2 VGA (70° DFOV) +<br>2 720P (90° DFOV) | 3 Data + 3 Clk<br>(with MIPI Bridge Chip) |
| 3 | 3<br>2 VGA (70° DFOV) +<br>1 720P (90° DFOV) | 3 Data + 3 Clk<br>(No MIPI Bridge Chip) |

FIG. 9

MULTI-BASELINE CAMERA ARRAY SYSTEM ARCHITECTURES FOR DEPTH AUGMENTATION IN VR/AR APPLICATIONS

RELATED APPLICATIONS

This application is a divisional of U.S. patent application Ser. No. 15/133,186 filed Apr. 19, 2016, which claims priority to U.S. patent application Ser. No. 62/149,636 filed Apr. 19, 2015, the disclosures of which are incorporated by reference herein in their entirety.

FIELD OF INVENTION

The present invention generally relates to multi-baseline camera array system architectures for depth augmentation in virtual reality/augmented reality applications. More specifically, the present invention relates to systems and methods for using a multi-baseline imaging system in order to determine depth information for near-field and far-field objects.

BACKGROUND

Augmented Reality ("AR"), virtual reality ("VR") and Mixed Reality ("MR") devices envision an imaging system that seeks to combine virtual objects with real world views seamlessly to provide a compelling user experience. In particular, VR is a computer technology that replicates an environment, real or imagined, and simulates a user's physical presence and environment in a way that allows the user to interact with it. In AR applications the real world is enhanced with virtual computer graphics that are visible to the user via a display technology such as a heads up display or a projector. The augmentation might be something as simple as text notifications or as complex as a simulated screen. As such, augmented reality attempts to combine a real environment surrounding a user along with synthetically generated images in tandem. In mixed reality, one combines the best of AR and VR by allowing the user to see the real world around them while also seeing virtual objects rendered into the user's field of view. These virtual objects are anchored to a point in real space, making it possible to treat them as an integral part of the scene from the user's perspective. In order to achieve a realistic experience, the interaction between the real and virtual objects in mixed reality needs to be replicated in such a manner that closely resembles how these objects would interact in the real world, and thus the manner in which the AR/VR/MR system is able to determine the spacing and depth of objects in the real world is of significant importance in determining how these objects are shown to interact with virtual objects. MR, VR, and AR applications can be used for a variety of different purposes, including: commercial uses like entertainment, and gaming; military uses including combat or pilot training; and educational uses, among many other uses.

SUMMARY OF THE INVENTION

Systems and methods for estimating depth with camera arrays in accordance with embodiments of the invention are disclosed. In one embodiment, a method of estimating distances to objects within a scene from a set of images captured from different cameras in a set of cameras using a processor configured by an image processing application, the method includes generating an initial depth map of a scene, identify near-field and far-field portions of the scene, refine the depth map for the near-field portions of the scene using image data captured from a near-field set of cameras, and refine the depth map for the far-filed portions of the scene using image data captured from a far-field set of cameras.

A further embodiment includes illuminating the scene using an illumination light source positioned within a threshold distance from a reference camera.

In another embodiment, the near-field portions of the scene are at a distance less than a certain threshold and the far-field portions of the scene are at a distance greater than the certain threshold.

In a still further embodiment, a baseline distance between cameras in the near-field set of cameras is less than a baseline distance between cameras in the far-filed set of cameras.

In still another embodiment, each camera in the set of cameras has the same imaging properties.

In a yet further embodiment, the set of cameras have different field of views.

In yet another embodiment, the set of cameras have different resolutions

In a further embodiment again, the set of cameras image in different portions of a light spectrum.

In another embodiment again, the set of cameras are monochrome cameras with a same field of view and resolution.

In a further additional embodiment, the monochrome cameras image across at least a portion of the visible spectrum and at least a portion of the near-IR spectrum.

In another additional embodiment includes using the depth map in order to determine where to render an object on a display of a VR application such that the object is appropriately occluded by a real world object also being displayed within a VR application.

In a still yet further embodiment includes using the depth map in order to determine where to render an object on a display of an AR application such that the object is appropriately occluded by a real world object visible through a transparent display within the AR application.

In still yet another embodiment, the set of cameras are mounted within a headset that includes a display via which images can be displayed.

In a still further embodiment again, a reference camera and the display are part of a removable component that is mounted within the headset.

In a further embodiment, A camera array includes a first subarray of cameras positioned at a first location, the first camera array including at least two cameras, a second subarray of cameras positioned at a second location, the second camera array including at least two cameras, a third subarray of cameras positioned between the first location and the second locations, the third subarray of cameras including at least one reference camera; and an illumination light source positioned within a threshold distance from the reference camera.

In another embodiment, the cameras in the first, second, and third subarrays of cameras have the same imaging characteristics.

In a still further embodiment, the cameras in the first and second subarrays of cameras have different imaging characteristics from the at least one reference camera.

In still another embodiment, the cameras in the first and second subarrays of cameras each have a different epipolar axis with the reference camera.

In a yet further embodiment, the cameras are all monochrome cameras with a same field of view.

In yet another embodiment, the field of view is selected from the group consisting of 70 degrees and 90 degrees.

In a further embodiment again, the camera array is mounted to a headset and at least one camera in the camera array is part of a removable component mounted within the headset.

In another embodiment again, image data obtained from the cameras is used to generate a depth map of a scene.

In a further additional embodiment, a baseline distance between the first camera array and the third camera array is less than a baseline distance between the first camera array and the second camera array.

In another embodiment provide a camera array that includes several cameras, an illumination system configured to illuminate a scene with a projected texture, a processor, memory containing an image processing pipeline application and an illumination system controller application, where the illumination system controller application directs the processor to control the illumination system to illuminate a scene with a projected texture, where the image processing pipeline application directs the processor to: generate an initial depth map of a scene; identify near-field and far-field portions of the scene, refine the depth map for the near-field portions of the scene using image data captured from a near-field set of cameras, and refine the depth map for the far-filed portions of the scene using image data captured from a far-field set of cameras.

In a still yet further embodiment, the image processing pipeline application directs the processor to illuminating the scene using an illumination light source positioned within a threshold distance from a reference camera.

In still yet another embodiment, the near-field portions of the scene are at a distance less than a certain threshold and the far-field portions of the scene are at a distance greater than the certain threshold.

In a still further embodiment again, a baseline distance between cameras in the near-field set of cameras is less than a baseline distance between cameras in the far-filed set of cameras.

In still another embodiment again, each camera in the set of cameras has the same imaging properties.

In a still further additional embodiment, the set of cameras have different field of views.

In still another additional embodiment, the set of cameras have different resolutions.

In a yet further embodiment again, the set of cameras image in different portions of a light spectrum.

In yet another embodiment again, the set of cameras are monochrome cameras with a same field of view and resolution.

In a yet further additional embodiment, the monochrome cameras image across at least a portion of the visible spectrum and at least a portion of the near-IR spectrum.

In yet another additional embodiment, the image processing pipeline application directs the processor to use the depth map in order to determine where to render an object on a display of a VR application such that the object is appropriately occluded by a real world object also being displayed within a VR application.

In a further additional embodiment again, the image processing pipeline application directs the processor to use the depth map in order to determine where to render an object on a display of an AR application such that the object is appropriately occluded by a real world object visible through a transparent display within the AR application.

In another additional embodiment again, the set of cameras are mounted within a headset that includes a display via which images can be displayed.

In a still yet further embodiment again, a reference camera and the display are part of a removable component that is mounted within the headset.

A further embodiment includes estimating distances to objects within a scene from a set of images captured from different cameras in a set of cameras using a processor configured by an image processing application, the method includes estimating depth to various regions of a scene using images from several cameras, where a precision of a depth estimation varies with different regions of the scene.

In another embodiment, the depth estimation precision of a depth estimate for a near-field region of the scene is different from a precision of a depth estimate for a far-field region of the scene.

In a still further embodiment, the depth estimation precision varies due to estimating depth in different regions using different numbers of depth samples.

In still another embodiment, the depth estimation precision varies due to estimating depth in different regions using different numbers of depth samples.

In a yet further embodiment, the depth estimation precision varies due to estimating depth in different regions using different numbers of the images captured by the cameras.

In yet another embodiment, the depth estimation precision of a region is determined based upon an initial estimate of the depth of an object located in the region.

In yet another embodiment, the depth estimation precision of a region is determined based upon a location of the region within the field of view of the reference camera.

BRIEF DESCRIPTION OF THE DRAWINGS

FIG. 3 illustrates a table that provides some of the requirements that may be satisfied by many camera arrays utilized in AR/VR/MR applications in accordance with embodiments of the invention.

FIG. 5 illustrates a table that shows the depth accuracy values as a function of object distance and other imaging parameters for a camera array in accordance with an embodiment of the invention.

FIG. 9 provides a table that summarizes the different configurations and modes of operations and itemizes the interface (e.g. MIPI lanes) on the illustrated processing systems as well as the compute and power savings possible in accordance with an embodiment of the invention.

DETAILED DESCRIPTION

Figure 1:
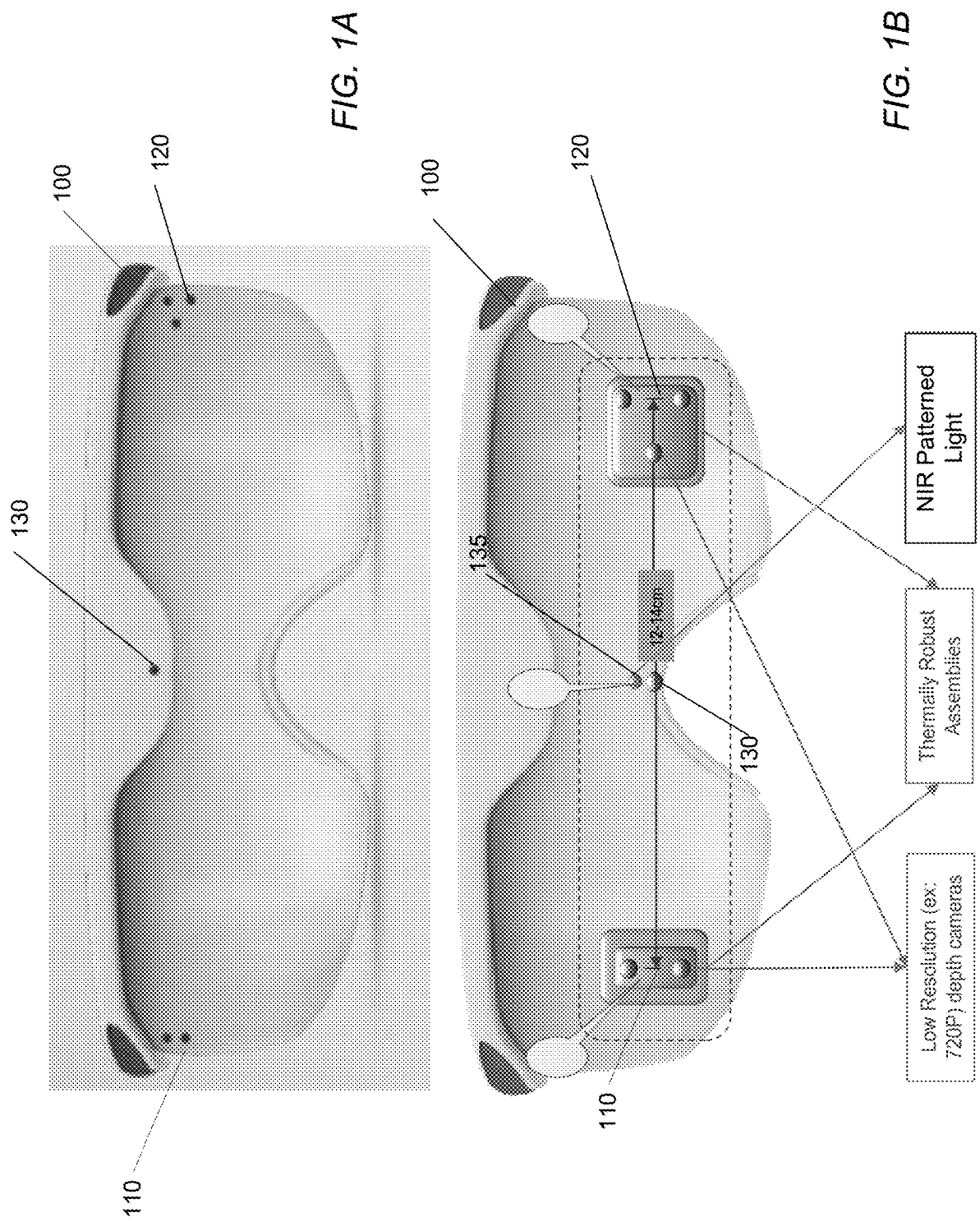
FIG. 1A illustrates a camera array forming part of an augmented/mixed reality headset in accordance with an embodiment of the invention.
FIG. 1B illustrates a camera array forming part of an augmented/mixed reality headset in accordance with an embodiment of the invention.

Turning now to the drawings, systems and methods that utilize camera arrays to obtain depth information for use in virtual reality (VR)/augmented reality (AR) or mixed reality (MR) applications are described. An AR/VR/MR experience can be enhanced by sensing depth of real world objects in real-time with sufficient precision so that virtual objects that are anchored or inserted into real-world imagery are consistent with their local and global topological relationships. Systems and methods in accordance with various embodiments of the invention utilize an array of cameras mounted within an AR/VR headset to capture image data from which depth information can be derived. Once depth information is determined, the depth information can be utilized in extracting the pose of the user with respect to the environment, the creation of virtual objects, and/or subsequent rendering of a virtual environment displayed to the user. In addition, depth information can be utilized in object detection and recognition that can then drive the display of contextually relevant information to a user.

Merging virtual objects with real-world imagery is often referred to as z-keying. Z-keying applications can impose strict requirements upon depth accuracy across a working range and/or across a wide field of view in which virtual objects will be added to a scene. Accordingly, camera arrays in accordance with many embodiments of the invention utilize cameras having lenses with wide fields of view that can introduce larger optical distortions than is typical of cameras that are used in arrays that can be modeled as pinhole cameras for the purposes of processing the images captured by the cameras. In general, a wide field of view maybe characterized by a wide view angle, often a wide horizontal view angle that is larger than 80° 90°, 120°, or 150° while a narrow field of view may be characterized by a view angle that is less than 50°, 80°, 90°, 120°, or 150°. In some categorizations used by certain camera arrays, the camera array cameras may be considered "wide" when they have a field of view that may be greater than 80° and "narrow" when they have a field of view that may be less than 80°. Although the above describes wide and narrow field of views as specific numbered angles, the particular fields of view considered "narrow" or "wide" may vary based not only on the angle, but on a variety of other factors that as appropriate to the requirements of specific applications in accordance with embodiments of the invention. In a number of embodiments, camera arrays utilize cameras having subsets of cameras having different fields of view and utilize image data from different subsets to generate depth information for objects at different depths and within different regions of the field of view of the camera array. In several embodiments, depth accuracy across a wide operating range is achieved by utilizing a camera array in which subsets of cameras having different baselines are utilized depending upon an initial detected distance to an object. In certain embodiments, the subsets utilized to determine distance at different distances incorporate different imaging characteristics including (but not limited to) different resolutions and/or different fields of view with different distortion versus field height profiles. In this way, the characteristics of the cameras utilized in the array can be selected to provide depth accuracy across a field of view and operating range of distances appropriate to the requirements of a specific application. In addition to depth accuracy requirements, many AR applications contemplate utilization of AR headsets in both indoor and outdoor settings. Accordingly, camera arrays in accordance with several embodiments of the invention possess the ability to work in a variety of illumination conditions. In certain embodiments, cameras that are capable of capturing image data within the near-IR spectrum are included within a camera array to provide increased sensitivity in low lighting conditions. In many embodiments, the camera array incorporates an IR projector that can project IR texture on a scene to provide additional depth cues that can be utilized to increase depth estimation accuracy in appropriate lighting conditions. As can readily be appreciated, the use of an array using cameras with the same imaging characteristics or an array having cameras with different imaging characteristics will typically depend upon the requirements of a given application. The processing capabilities of camera arrays utilized in AR/VR/MR applications also typically depend upon the requirements of a given application such as (but not limited to) power consumption, latency and/or frame rate requirements. Meeting all of these constraints simultaneously remains a challenge for many of the depth technologies currently available.

Depth or distance to an object can be estimated from a set of images based upon parallax using a technique that is often referred to as multi-view stereo. Parallax refers to the extent to which foreground objects visible in images captured from different viewpoints shift with respect to the image background depending upon the viewpoint. Multi-view stereo techniques measure distance to objects by capturing images of a scene using an array of two or more cameras and using information concerning parallax shifts observed in the images to determine the distance to objects visible in the scene. In particular, two or more cameras separated by a distance can take pictures of the same scene and the captured images can be compared to determine observed shifts between corresponding pixels in two or more images. Pixels are deemed to be corresponding pixels in a stereo pair if the corresponding point in 3D space projecting onto each image plane of the stereo camera pair take on similar pixel values. This is referred to as the intensity constancy assumption. The amount an object is shifted between different camera views is called the disparity, which is inversely proportional to the distance to the object. A disparity search that detects the shift of an object in multiple images can be used to calculate the distance to the object based upon the baseline distance between the cameras and the focal lengths of the cameras involved. In very wide field of view lenses, the disparity due to parallax may cause corresponding pixels in images from a stereo camera pair to have very different field heights. The distortion and therefore MTF at these two points may be sufficiently different that these points may not match using the typical intensity constancy assumption. Accordingly, in many embodiments, the array cameras either increase the sensor resolution (and therefore the optical format) for a given wide field of view. Certain embodiments may design a lens carefully by distributing the distortion/MTF over field height in a controlled manner or a combination thereof. For many embodiments, there is an underlying assumption that whatever the field of view of the camera array, the design may ensure that the brightness constancy assumption will hold. In certain embodiments, the camera arrays may use resampling to increase consistency between pixels with images having different fields of view.

Various array cameras capable of estimating depth using parallax detection are described in U.S. Pat. No. 8,902,321 entitled "Capturing and Processing Images Using Monolithic Camera Array with Heterogeneous Imagers" to Venkataraman et al., filed Sep. 29, 20010 U.S. patent application Ser. No. 14/188,521 entitled "Thin Form Factor Computational Array Cameras and Modular Array Cameras" to Venkataraman et al., filed Feb. 24, 2014, and U.S. Pat. No. 9,264,592 entitled "Array Camera Modules Incorporating Independently Aligned Lens Stacks" to Rodda et al., filed Nov. 7, 2014. The disclosure including the disclosure related to array camera structures, the processing of images captured by cameras in an array camera to estimate depth and methods of constructing array cameras from U.S. Pat. Nos. 8,902,321, 9,264,592 and U.S. application Ser. No. 14/188, 521 is hereby incorporated by reference herein in its entirety.

Processes for determining depth information using images captured by an array of cameras is also disclosed in U.S. Pat. No. 8,619,082 entitled "Systems and Methods for Parallax Detection and Correction in Images Captured Using Array Cameras that Contain Occlusions using Subsets of Images to Perform Depth Estimation" to Ciurea et al., filed Mar. 13, 2013. U.S. patent application Ser. No. 14/207,254 entitled "Systems and Methods for Synthesizing Images from Image Data Captured by an Array Camera Using Restricted Depth of Field Depth Maps in which Depth Estimation Precision Varies" to Venkataraman et al., filed Mar. 12, 2014. The disclosure including the disclosure related to processing image data captured by an array camera to obtain depth information, the processing of subsets of images captured by an array camera to obtain depth information in the presences of occlusions, and processes for generating depth maps in which depth estimation precision varies from images captured by an array camera from U.S. Pat. No. 8,619,082, and U.S. patent application Ser. No. 14/207,254 is hereby incorporated by reference herein in its entirety.

As described above, meeting the various constraints for z-keying in AR/VR/MR applications, including working range, working field of view, ability to work in different illumination conditions, power consumption, among various others can require the construction of a specialized camera array, corresponding lenses, and/or the efficient utilizing of depth estimation processes customized to the specific placement and imaging characteristics of the cameras in the camera array. A camera array forming part of an augmented/mixed reality headset in accordance with an embodiment of the invention is illustrated in FIGS. 1A and 1B. In particular, FIG. 1A illustrates an augmented reality headset 100 with a first array of cameras 110 positioned on the left end of the frame, a second array of cameras 120 positioned on the right end of the frame, and one or more cameras 130 positioned between the first array of cameras 110 and the second array of cameras 120. The multi-baseline imaging architecture may use one or more of these various cameras 110-130 in order to obtain depth information for a scene.

The design illustrated in FIG. 1A includes cameras distributed around a reference camera. Various array cameras structures, including camera positioned around a reference camera are described in U.S. Pat. No. 8,902,321, the relevant disclosure from which is incorporated by reference herein in its entirety. Distributing cameras around a reference camera can increase depth estimation accuracy around the edges of foreground objects visible in the field of view of a reference camera. The presence of a camera above, below, to the left, and/or to the right of the reference camera increases the likelihood that the edge of the foreground object will also be visible in another of the cameras in the array. By ignoring images from cameras in which the edge and areas adjacent to the edge of the foreground object is occluded, precise depth estimates can be obtained. Accordingly, within a given subset of cameras that may be utilized to estimate depth within a given range of distances and/or within a different region of the field of view, it is desirable that the subset of cameras include cameras distributed around a reference camera (e.g. above, below, to the left, to the right) in order to provide an ability to handle occlusions within the subset of cameras. In certain embodiments, a first subset may only be utilized to determine depth with respect to foreground objects. Therefore, the first subset is not required to have cameras distributed around a reference camera for the purpose of handling occlusions. In this way, the first subset may be a single pair of cameras. Additional subsets utilized to determine depth to objects further from the array camera can incorporate a distribution of cameras to handle occlusions. An example of such an array of cameras implemented in accordance with embodiments of the invention is discussed below with reference to FIG. 4. As can readily be appreciated, the specific groupings and arrangements and cameras utilized in a camera array for the purpose of estimating depth of objects located at different distances and within different regions of the field of view of the array camera is largely dependent upon the requirements of specific applications.

In many embodiments, image data captured by cameras in the array of cameras can be used to synthesize images of a scene from captured image data. In a number of embodiments, fusion of image data involves computing depth to objects within a scene captured by an array of cameras in order to generate depth maps, and detect and correct parallax in images captured using the array cameras. Processes for the detection and correction of parallax in images captured using array cameras are described in U.S. Pat. No. 8,619,082, the relevant disclosure from which related to estimating depth from images captured by an array of cameras is incorporated by reference above. Processes for fusing image data from images captured by an array of cameras using a depth map are described in U.S. Pat. No. 9,047,684 entitled "Systems and Methods for Synthesizing High Resolution Images Using a Set of Geometrically Registered Images" to Lelescu et al., filed Oct. 21, 2014, the relevant disclosure from which including disclosure related to parallax correction and the fusion of image data to synthesize images is hereby incorporated by reference in its entirety.

FIG. 1B illustrates certain spacing details, including the measured space between the first array of cameras 110 and the second array of cameras 120. As illustrated in this example, the baseline distance between the camera arrays is between 12-14 cm. Furthermore, FIG. 1B also illustrates an NIR patterned light 135 positioned near the middle camera 130. In some embodiments, the NIR projected light may be patterned, structured, and/or textured, and may not necessarily be that the light source itself. In several embodiments, the NIR may be a flat field NIR light source (e.g., flash). In many embodiments, the NIR light source may be a laser and or LED.

In some embodiments, the cameras 110-130 may be distributed symmetrically around a near-IR light source, and the near-IR light source 135 may be positioned as close as possible to the reference camera 130 in order to reduce the likelihood of occlusions of the projected texture in portions of the image visible to the reference camera 130.

In some embodiments, the cameras in the camera arrays 110-120 positioned around the central camera array 130 may be low resolution (e.g., 720P) depth cameras. In other embodiments, all of the cameras 110-130 may share the same imaging characteristics (e.g., all cameras are 720P, black and white cameras). In certain embodiments, different cameras may capture different portions of the light spectrum.

Although FIGS. 1A and 1B illustrate a camera array utilized by an augmented reality headset, any of a variety applications, including virtual reality applications, gaming applications, among many others may utilize camera arrays with cameras positioned at various locations for capturing depth information as appropriate to the requirements of specific applications in accordance with embodiments of the invention. System architectures for camera arrays will be described below.

Multi-Baseline Camera Arrays

In order to capture depth information for a variety of objects located at a variety of different distances within a scene, camera array in accordance with many embodiments of the invention may utilize one or more subsets of cameras having different baseline distances between cameras as needed for accurately determining depth for far-field and near-field objects. A camera array that utilizes one or more camera arrays in accordance with an embodiment of the invention is conceptually illustrated in FIG. 2. The camera array includes a left side camera subarray 210, a right side camera subarray 220, and a central camera subarray 230. The left side camera subarray 210 includes two cameras 201 and 202 (i.e., 2×1 camera array) aligned along a vertical axis. The right side camera subarray 220 includes three cameras 203, 204 and 206 with two of the cameras 203 and 204 aligned along a vertical axis, and the third camera 206 that together form a triangular structure. The left and right side camera subarrays 210 and 220 are located in complementary occlusion zones on either side of a reference camera subarray 230 that includes one camera 205 and an illumination system 235.

The camera arrays 210-230 and illumination system 235 are controlled and communicate with a processor 240. The processor is also configured to communicate with one or more different types of memory 245 that can be utilized to store an image processing pipeline application 250 and a depth map data 255. The depth map data 255 can include (but is not limited to) depth maps, meshes, color information, texture information, and/or point clouds. In many embodiments, one or more of the camera subarrays 210-230 may be used to capture images and/or video of a scene. Images captured from cameras within one or more of the subarrays can be utilized to generate depth maps.

The imaging pipeline implemented using the processor 240 can take a variety of forms as outlined in the various patents and applications incorporated by reference above that describe processes for generating depth maps and synthesizing images based upon information captured by an array of cameras. In many AR/VR/MR systems the imaging pipeline includes at least the following four stages: (1) Photometric Normalization: Normalizes the photometric imbalances between the cameras; (2) Geometric Normalization: Normalizes the geometric variations between the different cameras and compensates for varying focal lengths, fields of view, magnification and distortion changes; (3) Parallax Detection: The main stage that computes the depth estimates from the disparities between corresponding pixels optionally handling any occlusions that may be present and optionally varying the precision of depth estimates depending upon the region of the field of view of the camera array and the depth of the object (4) Regularization: Regularization can optionally be performed to fill in the regions with low confidence depth values from the surrounding high confidence depth values using various image priors to provide a regularized depth map. In some embodiments, the regularization stage is replaced by a 3D point cloud stage that takes the pixels depths computed in 'Parallax Detection' stage and in combination with a high-confidence depth map and forward mapping process outputs a 3D point cloud. The 3D point cloud corresponding to a scene may be the 3D world coordinate of the pixels captured by the camera array. Where the processor takes the form of a system on chip that may include a main processor or CPU, a graphics processor (GPU) and/or a digital signal processor (DSP), different stages in the image processing pipeline can be implemented on different processors within the system on chip using firmware and/or a combination of firmware and software. The specific manner in which an image processing pipeline is implemented largely depends upon the processors present within a given AR/VR/MR system and can utilize application specific integrated circuitry and/or field programmable gate arrays that are specifically designed to implement one or more of the image processing stages.

In many embodiments, the depth estimation process communicates with other processes in the AR/VR/MR system to exchange information concerning regions within the field of view of the camera array and/or distances at which the AR/VR/MR system is attempting to perform z-keying to overlay a virtual object on an image of the scene and/or render the virtual object on a transparent display through which a viewer can see the virtual object overlaid on the scene. As can readily be appreciated, an AR/VR/MR system may only require high degrees of depth accuracy in regions in which z-keying is performed or is likely to be performed. Accordingly, the image processing pipeline can utilize processes such as those described in U.S. patent application Ser. No. 14/207,254 entitled "Systems and Methods for Synthesizing Images from Image Data Captured by an Array Camera Using Restricted Depth of Field Depth Maps in which Depth Estimation Precision Varies" to Venkataraman et al., filed Mar. 12, 2014 to vary the depth estimation precision at different distances and/or within different regions of the field of view of the camera array in accordance with instructions received from rendering processes executing on the AR/VR platform, which may take the form (but are not limited to) rectangular regions of interest within the field of view, and/or depths of field in which higher depth estimation precision is required. In certain embodiments, regularization can also be limited to those areas in which high precision depth information is required. In certain other embodiments, the camera array used for computing depth information may be augmented with a high-resolution main camera that is used for capturing RGB color images/video of the scene. In such embodiments, the main camera can capture RGB images (or video), which are augmented with depth information from the camera array. The parameters used to capture the RGB color image (or video), such as exposure, gain, frame rate, can be modulated by the presence of the virtual object that is being rendered in the z-keying process. For example, the focus/exposure used to capture the RGB image (or video) of the scene may be computed using the virtual object as the focal point of the scene capture. This may result in an image being captured wherein the virtual object is the focal point of the capture and the background is appropriately defocused/de-emphasized. The final captured image may have both the real and virtual objects in the scene but with the emphasis (e.g., in terms of focus cues and exposure) being on the virtual object. Although the above describes using array cameras within an AR/VR/MR context to compute depth information, array cameras may be used in other contexts, including (but not limited to) camera arrays incorporated within mobile phone handsets, tablets, desktops, laptops, gaming systems, among various other computing platforms that may utilize cameras for depth information as appropriate to the requirements of specific applications in accordance with embodiments of the invention. As can readily be appreciated, the specific imaging processes performed by an array camera may be determined by the requirements of a specific application in accordance with various embodiments of the invention.

Figure 2:
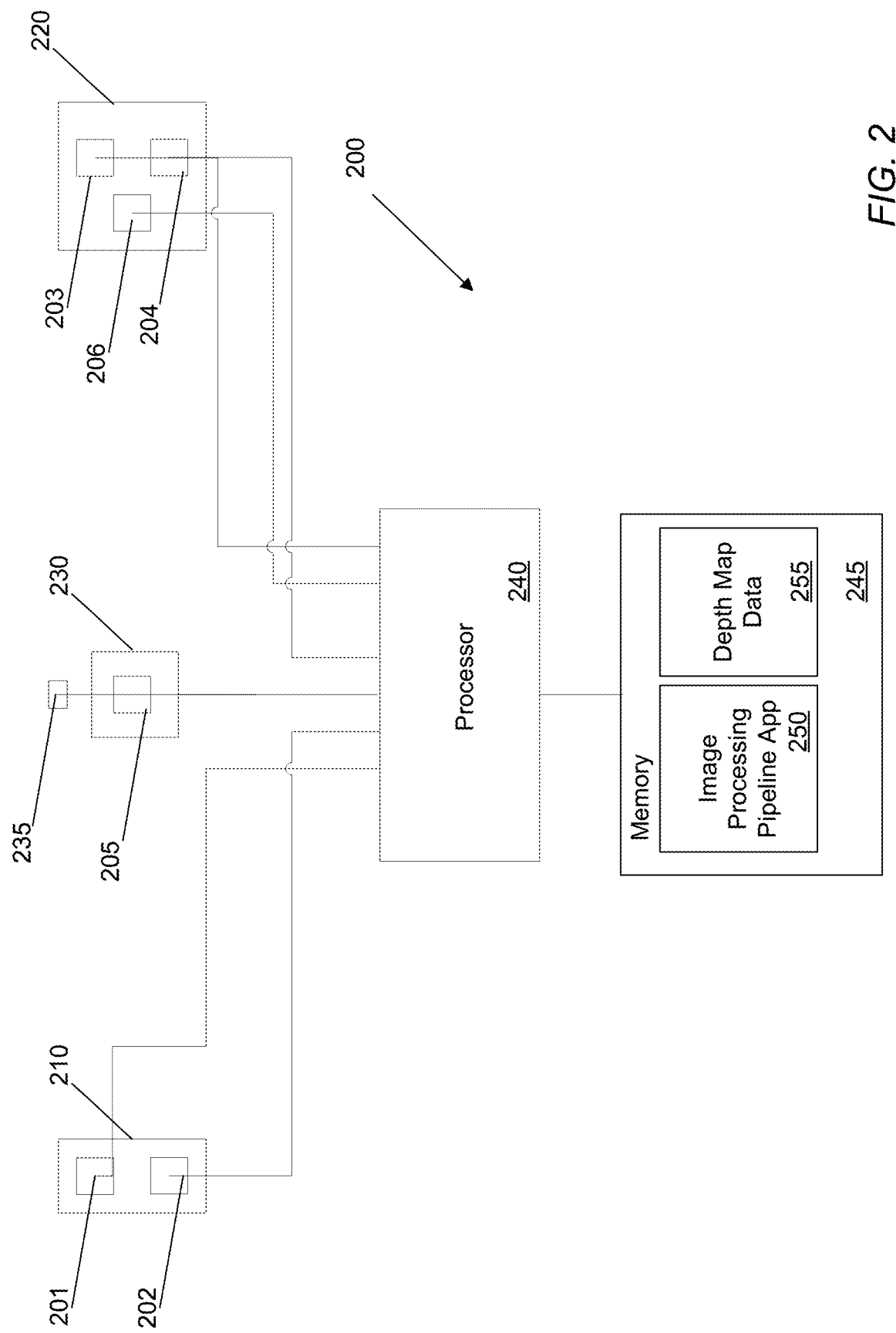
FIG. 2 conceptually illustrates a camera array that utilizes one or more camera arrays in accordance with an embodiment of the invention.

Although FIG. 2 illustrates a multi-baseline camera array for capturing depth information using two camera subarrays positioned on opposite sides of a reference camera, any of a variety of different camera array configurations may be utilized, including camera subarrays positioned on top, bottom, front, back of a reference camera, or camera subarray as appropriate to the requirements of specific applications in accordance with embodiments of the invention. This can include multiple camera arrays oriented in different directions so as to capture a 360° view of the scene. Further examples of different camera array architectures for capturing depth information are described below.

Computational Requirements and Calibration Robustness

A singular problem of some embodiments of the multi-baseline imaging system may be that the system is likely to be mounted on a frame that may not be mechanically or thermally stable as a whole. The disparity estimation processes utilized by many camera arrays relies on the relative orientation of the cameras in the array being fixed and known. When the cameras in the array are not rigid with respect to every other camera in the array this requirement is violated and disparity estimation (and therefore depth) estimates can become less reliable.

In some embodiments, the camera array performs a process of pose recovery to determine the relative spacing and orientation of the cameras in the array. The number of cameras in the array can play a critical role in performing pose recovery. Specifically, the presence of subarrays that are fixed in relation to a reference camera can help to stabilize the process of pose estimation and improve the accuracy of the pose estimation parameters. By imposing constraints from additional cameras in the array, the system may be able to not only recover the rotation but also the translation and scale. This has significant benefits in a number of potential vision applications including (but not limited to) AR/VR systems.

In many embodiments, the camera subarray to the right includes at least three cameras and may be assembled together on a board that provides thermal and mechanical rigidity. In other words, the cameras on this board are mechanically rigid with respect to each other and their motion is not independent of each other. Likewise, rigidity may be that the cameras have minimal to no translation, rotation, viewing direction changes, and/or any of a variety of other variations that may occur due to the influence of temperature and/or mechanical forces such as warp, bending, expansion, among a variety of other causes. In order to obtain the rigidity, many embodiments of the camera array may use low-CTE and high stiffness (e.g., high Young's modulus) substrates within the structure of the system. Young's modulus, which is also known as the elastic modulus, is generally defined as a mechanical property of linear elastic solid materials and defines the relationship between stress (force per unit area) and strain (proportional deformation) in a material. This enables robust pose estimation including rotation and translation (vector) using images captured by this subset of the cameras in the array. Using accurate depth information generated by the subset, estimates concerning the baselines and orientation of other cameras that are not rigidly fixed within the array can be performed. In several embodiments, a feature tracking process is used to track multiple features across any one of these cameras from frame to frame. Tracking a minimum number of feature points robustly enables the recovery of the essential camera matrix for the cameras in the array, from which rotation of the camera system as a whole is accurately derived. The recovery of translation, however, is accurate only up to an unknown scale factor. By considering the group of 3 cameras as a rigid whole and tracking the same feature points across all the cameras in the rigid sub-array and also across other cameras in the overall array, the system can recover the translation and scale to complete the robust recovery of pose for all of the cameras in the array.

The number of cameras present within the array and, more importantly, the number of cameras that are rigidly mounted relative to each other within the array enables continuous calibration of the baselines and orientations (i.e. pose) of all of the cameras in the array whether rigidly fixed with respect to each other or not. In general, two cameras that are rigidly fixed with respect to each other in a camera array may be sufficient to turn the pose recovery problem with respect to all of the cameras in the array into a fully determined problem. However, the addition of a third camera may increase the robustness of pose recovery to noise and other factors. Accordingly, camera arrays in accordance with many embodiments of the invention include a plurality of cameras that are non-rigidly mounted with respect to each other and at least two cameras that are mounted with sufficient rigidity to retain calibration and produce reliable depth estimates from which continuous calibration of the overall array of cameras can be performed.

As can readily be appreciated, many embodiments of the baseline camera array system have more than three cameras in the multi-baseline camera array system. Some embodiments have a group of two cameras to the right and a center camera. By enforcing a similar set of constraints on the group to the left, the system may retrieve the pose at video rates for the camera group on the left. For the center camera, the system of certain embodiments may have the task of estimating the pose from the robust pose estimates of the camera groups to the left and right. This problem is now bounded by the pose estimates at either end. In addition, by incorporating additional constraints from the mechanical design itself processors in accordance with many embodiments of the invention can further improve the accuracy with which the pose of the cameras in the array is determined and the calibration of the camera array is maintained.

Without these constraints, the problem of retaining calibration in the presence of thermal and mechanical shock to the AR/VR/MR system may become an entirely under-determined problem with no clear solution. This is one reason why a purely stereo solution (i.e. only two cameras) is likely to have trouble maintaining calibration in the field. A stereo camera with a large baseline may be difficult to construct in a way that maintains mechanical and thermal stability during operation. When the cameras are free to move in ways that result in a degradation of calibration, the problem of pose determination across cameras becomes an under-determined one and reduces the accuracy of depth estimates.

The process described above (pose estimation), may be combined seamlessly with the re-calibration process (or restoration of calibration status) such as to ensure a high degree of robustness to the inevitable geometric transformations that will be incurred in the field due to numerous factors including temperature, flexing, shock, etc. Especially for the intended general use envisioned for camera arrays incorporated within AR/VR/MR systems, it is anticipated that this robustness to change will be one of the critical requirements that can provide significant benefits when addressed.

Some embodiments may utilize a complementary processing system that has been developed and tested and consists of a live recovery of lost calibration as the scene is imaged. In certain embodiments, camera arrays can use this complementary processing to successfully fuse image data from multiple images captured from different viewpoints, where again, maintaining calibration is very important to the success of camera functionality. Processes for synthesizing images from image data captured by a computational camera arrays are disclosed in U.S. Pat. No. 9,047,684, the relevant portions of which related to combining image data from multiple images to synthesize new images is incorporated by reference in its entirety above.

Active Illumination in Near-IR

A pseudo-random texture pattern that is non-equidistant may be projected by an active illumination source in Near-IR. The potential source emitter technologies may be some kind of laser source that are in many embodiments are within a wavelength range from 800 nm to 1000 nm. In certain embodiments, the manner in which the pattern is projected is determined so that the pattern can be resolved over the required working range of the system (e.g. 0.15 m to 4.0 m). In other words, the elements of the projected patterns are designed so that they do not merge into one another over the entire working range.

In a number of embodiments, the characteristics of the patent can include (but are not limited to): a projected pattern in the Near-IR portion of the spectrum (optionally) utilized in combination with cameras that are achromatized to capture images across wide spectral bands that encompass at least a portion of the Near-IR spectrum; quasi-random patterns (arbitrary but non-periodic); and/or the pattern projected in such a way that the field of view of camera array is slightly over-filled in order to account for lateral offset between source and camera.

In some embodiments, a near-field structured illumination system active only up to 1 m may consume only about 50 mW of power and can utilize an approach such as (but not limited to) an LED based refractive approach. However, in embodiments that utilize an active illumination system that extends the range of the illumination system to a working distance of 4 m, a laser based source can be used in combination with a diffractive approach. In this case, the power requirements may be considerably larger (~1 W). However, the software pipeline may use strategies such as strobing based on scene content analysis and skipping frames to mitigate the power requirements and current draw significantly.

In many embodiments, arrays of cameras are utilized in complementary occlusion zones surrounding the illumination system. Estimating depth using a set of images captured by a linear array of cameras typically involves performing disparity searches along epipolar lines. In many embodiments, the location of the illumination system in the camera array can be strongly influenced by the location of the reference camera in the camera array used to compute the depth. Having the near-IR emitter as close as possible to the reference camera may ensure that shadows from the near-IR emitter are minimized and the projected texture is maximally incident on the scene as captured by the reference camera. Accordingly, the use of two dimensional arrays of cameras located in complementary occlusion zones around an illumination system located close to the reference camera can significantly enhance depth estimation performance.

The cameras in the array may be sensitive to IR light. Regularization uses the relationship between intensity and depth, and the IR light may get in the way of this by projecting texture at various locations. Accordingly, many embodiments may need to determine which points may have been increased intensity due to the presence of the projected illumination pattern, and to conduct more careful analysis in these regions. In some embodiments, a reference camera may have an IR-cut filter and can be used to determine which points may have increased intensity due to the presence of the projected near-IR pattern. For example, if the system uses an IR strobe, then it may end up with an image with a pattern laid over it and all the IR dots will be a depth. Because the system may already have a depth at that point, it will know how the depth has to be warped to the image of the main reference camera, for example, by looking at the green channel and estimating whether the point does or does not have increased intensity due to the presence of the projected near-IR pattern. In accordance with some embodiments, the system can disambiguate IR fiducial marks with non-IR fiducial marks to assist with depth regularization. This may be beneficial when tracking features (e.g., fiducial marks) temporally to compute the camera pose. Since, the location of the IR fiducials change from one frame to the next, it may be beneficial to not consider these in the computation of camera pose. Thus, the identification of IR fiducial marks as distinct from non-IR fiducial marks may be beneficial to the correct computation of camera pose.

In addition to the use of Near-IR-structured illumination in the manner described above, systems and methods in accordance with several embodiments of the invention can utilize homogeneous (Near-IR) illumination (e.g. a Near-IR flash) in order to improve edge visibility in cases of naturally poorly illuminated scenes. This can either be done by an independent ("flat-field") illumination system, at whatever wavelength is found suitable (Near-IR might be preferable since it is not visible to the human eye, but in certain cases visible light could be usable as well). For this a regular near-IR or visible light flash device for mobile applications could be employed. Alternatively, many systems utilize the limited efficiency (or dynamic range) of structured illumination devices already used in the depth solution, or intentionally even further decrease the efficiency of the same. Specifically, in structured illumination systems it is often difficult to build a structured illumination system in which all of the projected light is contained within the desired bright areas (e.g. "spots") and no light in the "background" (or desired dark areas). So dark is never really dark, and consequently the dynamic range of the structured illumination is pretty limited. However, as already mentioned above this means that the whole scene gets slightly illuminated and this can help in cases of well textured but poorly illuminated scenes. Integration time can be reduced, and frame rate can potentially be increased. In many instances, edges get smoother since they are not necessarily limited by the sampling of the structured illumination. One could also try to make the ratio of how much light goes into the structure and how much gets homogenously distributed over the scene tunable. E.g. by changing the wavelength of the (laser) emitter by changing its temperature in combination with a diffractive element for the beam shaping (diffraction efficiency is a function of wavelength). As can readily be appreciated, the specific mechanism used to control the amount of contrast between the bright portions of a projected pattern and the darker portions of a projected pattern are largely dependent upon the requirements of a specific application.

While various structured and homogenous illumination systems are described above that can be utilized in combination with a camera array for the purpose of providing depth information to an AR/VR/MR system, as can readily be appreciated the incorporation of an illumination source, the placement of the illumination source and the nature of the illumination source can vary depending upon the requirements of a specific application and the imaging characteristics and/or placement of cameras within an array. Various camera arrays adapted for use in AR/VR/MR systems in accordance with a number of embodiments of the invention are discussed further below.

Scope and System Requirements

The developments in the AR/VR/MR markets have presented a variety of different constraints and/or requirements that would ideally be met by any AR/VR/MR product or solution that is to satisfy these market demands. Accordingly, many embodiments of the invention provide various multi-baseline camera array architectures that meet certain key working requirements, including architectures that define a depth quality, working range, and compute and power constraints as ideally required to satisfy the AR/VR/MR market demands. In particular, some of the key requirements that may be satisfied by many camera arrays utilized in AR/VR/MR applications in accordance with embodiments of the invention are illustrated in Table 1 of FIG. 3.

As can readily be appreciated, the requirements indicated in Table 1 of FIG. 3 can vary depending upon the specific application and systems and methods in accordance with embodiments of the invention can be adapted accordingly. The sections described below address various other aspects of multi-baseline camera arrays including the proposed imaging architecture, depth accuracy and errors, operating characteristics enabling power and cost efficiencies, optical considerations, and computational targets. The subsequent sections also identify possible system optimization considerations that can enhance operational efficiency and can achieve reductions in cost and/or complexity of camera array implementations.

Multi-Baseline Camera Array Architectures

Figure 4:
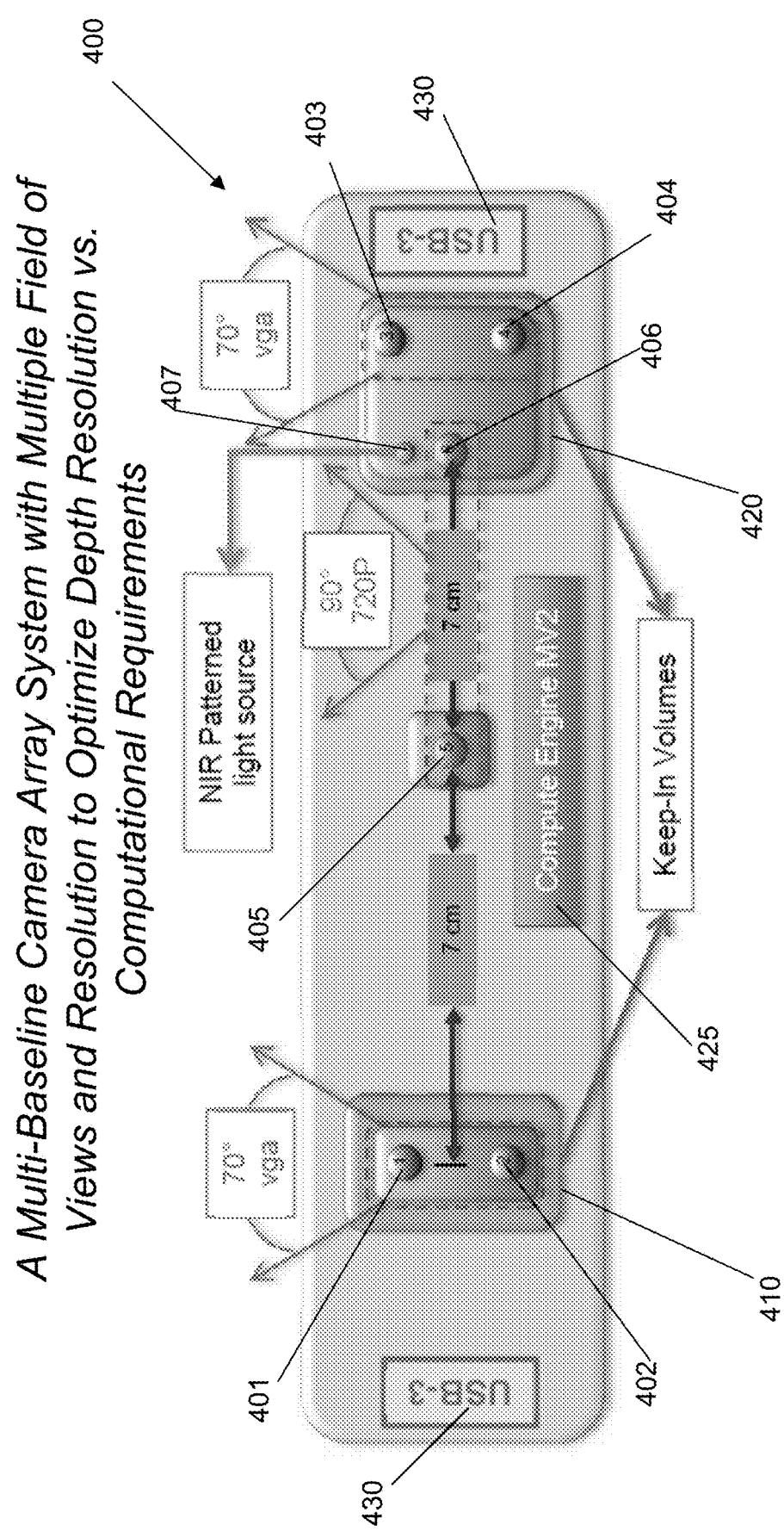
FIG. 4 illustrates a multi-baseline camera array architecture that satisfies many of the specifications outlined in FIG. 3 in accordance with an embodiment of the invention.

A multi-baseline camera array architecture that satisfies many of the specifications outlined in Table 1 of FIG. 3 in accordance with an embodiment of the invention is illustrated in FIG. 4. In the illustrated embodiment, the camera array #004 is a multi-baseline camera array that includes 6 cameras (401-406) in 3 separate groups or subarrays. The keep-in volume on the left side 410 houses two VGA cameras, 401 and 402, each of which can have a first diagonal field of view (a sample diagonal FOV we could use would be 70°). The keep-in volume on the right side 420 houses three cameras, 403, 404, and 406, placed at three locations defining a virtual triangle. The two vertically oriented cameras, 403 and 404, on the right side 420 may be VGA resolution with the same field of view as the VGA cameras on the left side 410 (e.g., 70° diagonal field of view), while the third camera, camera 406 on the right side 420 of the keep-in volume has 720P resolution with a second larger diagonal field of view (e.g., a 90° or 120° would be within the stated requirements). The housing of the right side 420 also includes an active illumination system 407. The third subarray includes a central camera 405 of 720P resolution also with the second larger diagonal field of view (e.g., a 90° or 120°).

Some embodiments may fix the diagonal fields of view of the VGA camera to be 70° and that of the 720P cameras to be 90°. In certain embodiments, all of the cameras may be designed to operate over a wide spectral band covering the entire visible spectral range and (optionally) a portion of the Near-IR range from 400 nm to 900 nm. This may maximize the spectral sensitivity and also enable the use of active illumination system (which works in the near-IR range) without impacting the user experience.

It should be noted that the DFOVs of cameras, especially the currently labeled as 90 degree FOV, including camera 406 and 405 of FIG. 4, may be adapted (refined) to the needs of specific AR/VR customers, specifically to possibly increase the DFOV to 120 degrees for the purposes of pose estimation. As is possibly the case for the 90 or 120 degree DFOV, the larger FOV cameras can be used in pose estimation at their full FOV capacity, while for the purposes of depth estimation the system may utilize the entire FOV or a smaller portion of the FOV (up to a certain field height in image space), such as that which corresponds to the 70-90 degree DFOV, which allows for a harmonization with the DFOVs of the other cameras in the array used for depth estimation.

The two end keep-in volumes 410 and 420 may be separated from each other by a total larger baseline (e.g., ~14 cm) and from the center camera 405 by a smaller baseline (e.g., 7 cm on each side).

A processing system 425 can be utilized to provide the interface connectivity to the cameras 401-406 through an interface, such as (but not limited to) MIPI interfaces, and the outside world through an interface 430 such as but not limited to a USB3 interface. In some embodiments, there is an option in terms of a bridge chip that is able to aggregate the camera interfaces (e.g. MIPI interfaces) and clock lanes of the camera groups 401, 402 and 405, 406 such as to free up more lanes for use by other sensors. For example, MIPI bridge chips (e.g., OV680) may combine up to 6 or fewer single lane MIPI interfaces into an output 1 or 2 lane MIPI interface. Thus in some embodiments, 4 VGA (30 fps) single lane MIPI outputs can be combined to a 2 lane MIPI output that will connect to the processing system 425 (e.g., Movidius MV2). This may provide the benefit of freeing up MIPI input lanes on the processing system for potentially connecting other sensors for other uses. The specific processing system, which may be a microprocessor, digital signal processor, graphics processing unit, system on chip combining multiple processing units, and/or application specific integrated circuit such as (but not limited to an FPGA), typically depends upon the requirements of a given application.

The above discussion simply represents discussion of a small number of embodiments of the overall system. As can readily be appreciated, any of a variety of camera combinations can be utilized in arrays as appropriate to the requirements of specific applications in accordance with various embodiments of the invention. The subsequent sections below outline the operational characteristics along with exploiting architectural efficiencies that enable a reduction in component and computational/power consumption costs. It should be noted that as the number of cameras is reduced in the following modes of operation, the bridge chip may become unnecessary.

Operational Mode and Depth Accuracy

The multi-baseline camera array systems proposed above may be designed to work over a fairly large depth of field, for example, from 0.15 m to 4 m. Far-field objects at distances greater than 1 m and up to 4 m may require a large operating baseline between cameras to get a high geometric depth accuracy (viz. error range of approximately 1%). These are provided by the far-field cameras, for example cameras 401, 402, 403, 404, and 406 of FIG. 4 with an average baseline separation of around 14 cm. However, as the object distance starts decreasing to below 1 m, one can run into the stereo vergence problem. In other words, there may not be sufficient overlap between the fields of view of the cameras to enable efficient triangulation of the scene content at very close distances.

One solution to the stereo vergence problem may be to have larger fields of view. However, this may typically complicate the disparity estimation process since the optical distortions associated with such large fields of view are typically large with corresponding degradations in the MTF that it can complicate the use of epipolar geometry in determining depth from disparity through pixel correspondence estimations. Under such conditions, the pixel intensity constancy assumption between corresponding pixels in stereo camera pairs may no longer be valid. Intensity constancy refers to the assumption that the image of a point in object space in two different cameras positioned at different viewpoints is of roughly equal intensity (assuming a Lambertian reflectance model in the object). Similarly, the focal length of the wider FOV cameras is less than a narrower FOV camera, which can have a proportional effect on decreasing the depth estimation precision. This factor can be evaluated quantitatively based upon the specification for a specific application detailing that higher DFOV cameras are required by the specific application.

In many embodiments, the camera array includes an additional camera (e.g., camera 405 of FIG. 4) for handling near-field objects at roughly 7 cm from the cameras at either end. The addition of this camera reduces the stereo vergence problem, but still provides for sufficient baseline such that near-field objects are triangulated for estimating depth at an appropriate geometric accuracy (e.g. 1% error). Cameras 403, 404, 405, and 406 of FIG. 4 may now handle the near-field objects, while the far-field objects may be handled by the cameras 401, 402, 403, 404, and 406.

In some embodiments, the operational requirements call for at least a 90° diagonal field of view for the 0.15 m to 1 m working range and this would necessitate that cameras 405 and 406 of FIG. 4 to have a higher diagonal field of view, while the remaining cameras are 70° diagonal field of view. However, an additional problem may become apparent when going to a higher diagonal field of view. In general, the larger field of view reduces the focal length of the imaging system with attendant reduction in the disparity between camera pairs. The reduction in disparity reduces the depth accuracy. To address this effectively, many embodiments of the camera array increase the image sensor diagonal by using a larger resolution (e.g., a 720P) sensor for cameras 405 and 406 of FIG. 4. With this increase in focal length of the camera array system it is now possible to meet the depth accuracy requirements over the entire working range.

Table 2 illustrated in FIG. 5 shows the depth accuracy values as a function of object distance and other imaging parameters in the system described above.

While specific arrays are described above with reference to FIGS. 1, 2, and 4, any of a variety of camera arrays can be utilized as appropriate to the requirements of specific applications. Furthermore, depth maps can be generated using image data from a subset of the cameras in an array to achieve efficiencies. Various processes for increasing computational efficiency of depth map generation and alternative camera array architectures in accordance with a number of embodiments of the invention are discussed further below.

Operational Efficiencies

Several possibilities exist for increasing the computational efficiency of a camera array by disregarding image data captured by one or more cameras in the array. A number of efficiencies that can be achieved are discussed below in the context of the camera array illustrated in FIG. 4. As can readily be appreciated, component counts and/or costs can reduced by eliminating cameras entirely from the camera array illustrated in FIG. 4 to restrict camera arrays to the imaging modes described below. The tradeoffs, as always, in these efficiency considerations impact the overall quality of the depth map.

Mode 1 [5 Cameras Active]

Figure 6:
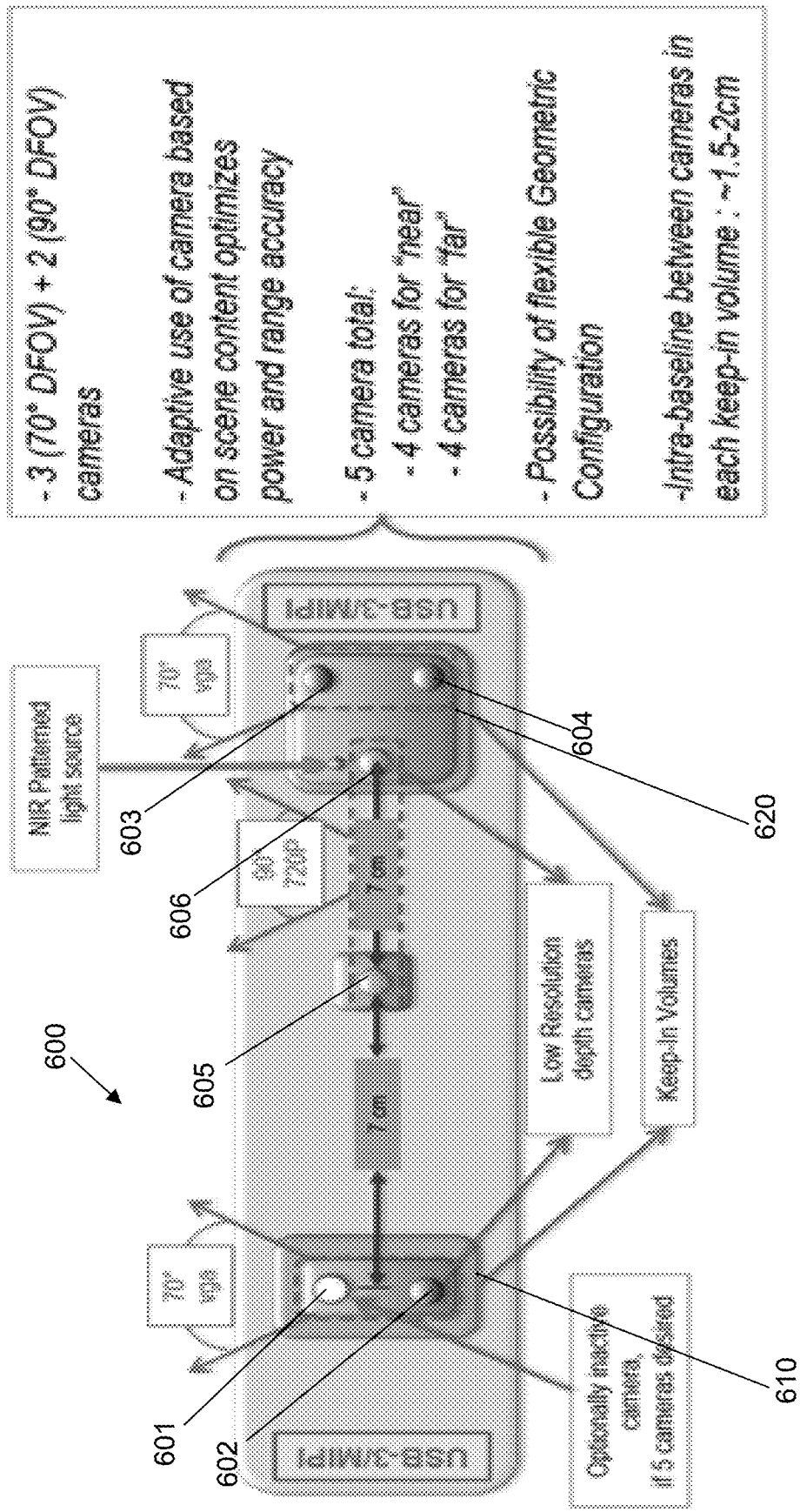
FIG. 6 illustrates a camera array with 5 cameras active in accordance with an embodiment of the invention.

In this mode illustrated in FIG. 6, a total of 5 cameras may be used. Only one camera, camera 602, for providing a large baseline (e.g. 14 cm) is retained as seen in FIG. 6. The system works as described before with the exception of one less camera, camera 601, (and thus one less long baseline being utilized in depth estimation). Cameras 603, 604, 605, and 606 may be suitable for the near field (avoiding the vergence problem for normal field of views as discussed above), while camera 602 may be used in far field operation (in conjunction with cameras 603, 604, 605, and 606).

Mode 2 [4 Cameras Active]

Figure 7:
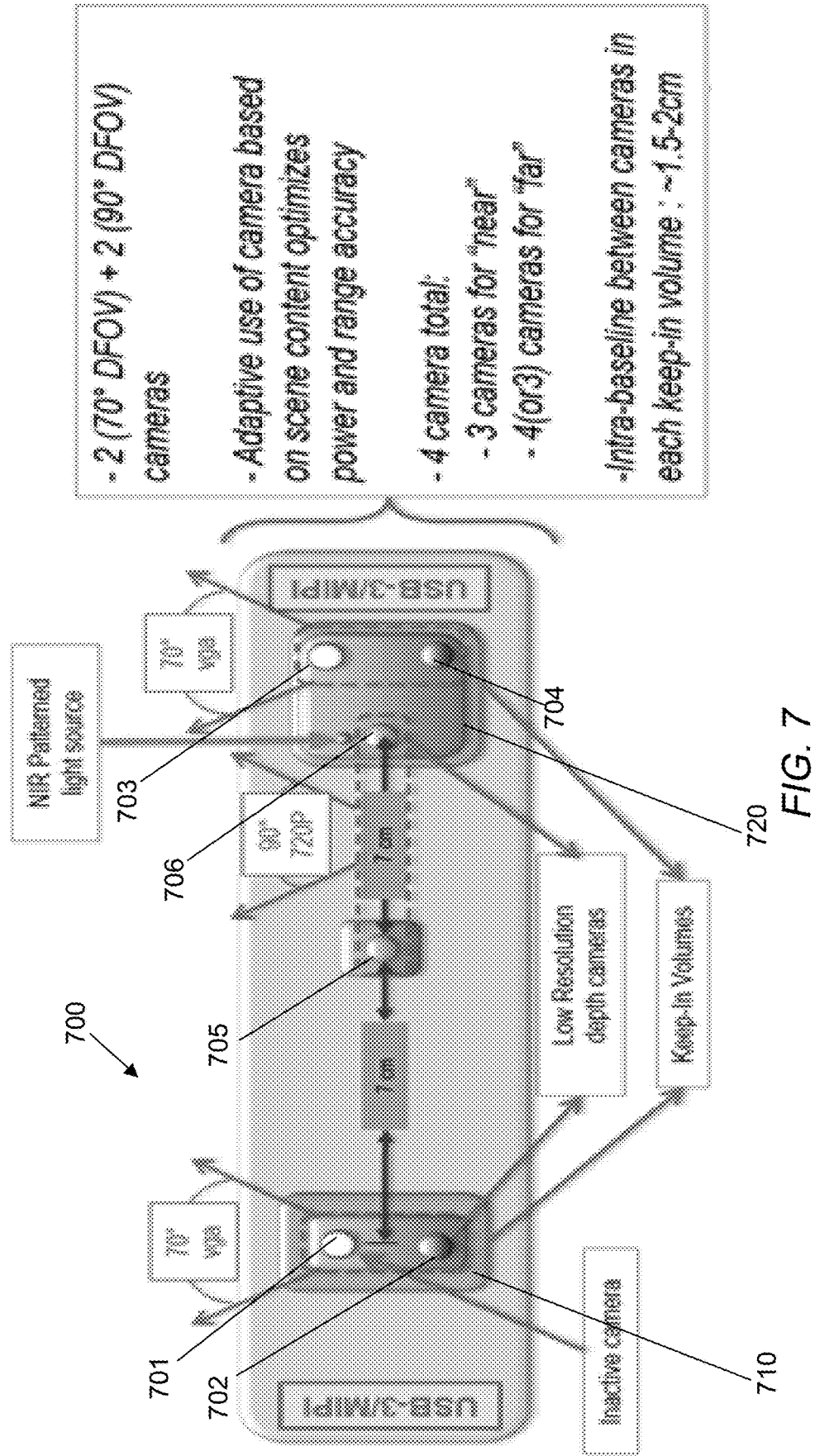
FIG. 7 illustrates a camera array with 4 cameras active in accordance with an embodiment of the invention.

In this mode a total of 4 cameras is used as illustrated in FIG. 7. Only one camera, camera 702, for ensuring a large baseline (e.g. 14 cm) is retained as seen in FIG. 7. The system works as described with the exception of one less camera (and thus one less long baseline being utilized in depth estimation). Cameras 704, 705, 706 are suitable for the near field (avoiding the vergence problem for normal field of views as discussed above), while camera 702 may be used in far field operation (in conjunction with cameras 704, 705, and 706). The additional trade-off in this operation mode, is that the occlusion coverage by the cameras is poorer than in MODE 1 illustrated in FIG. 6, where it matters most, i.e., for close objects ("near" range). Cameras 704, 705, 706, are arranged in such a fashion where the reference camera, camera 706 does not have another camera in the direction above and to the right of the reference camera to cover occlusions from that angle (compared to MODE 1). These aspects can, however be addressed to some degree in a subsequent processing stage.

Mode 3 [3 Cameras Active]

Figure 8:
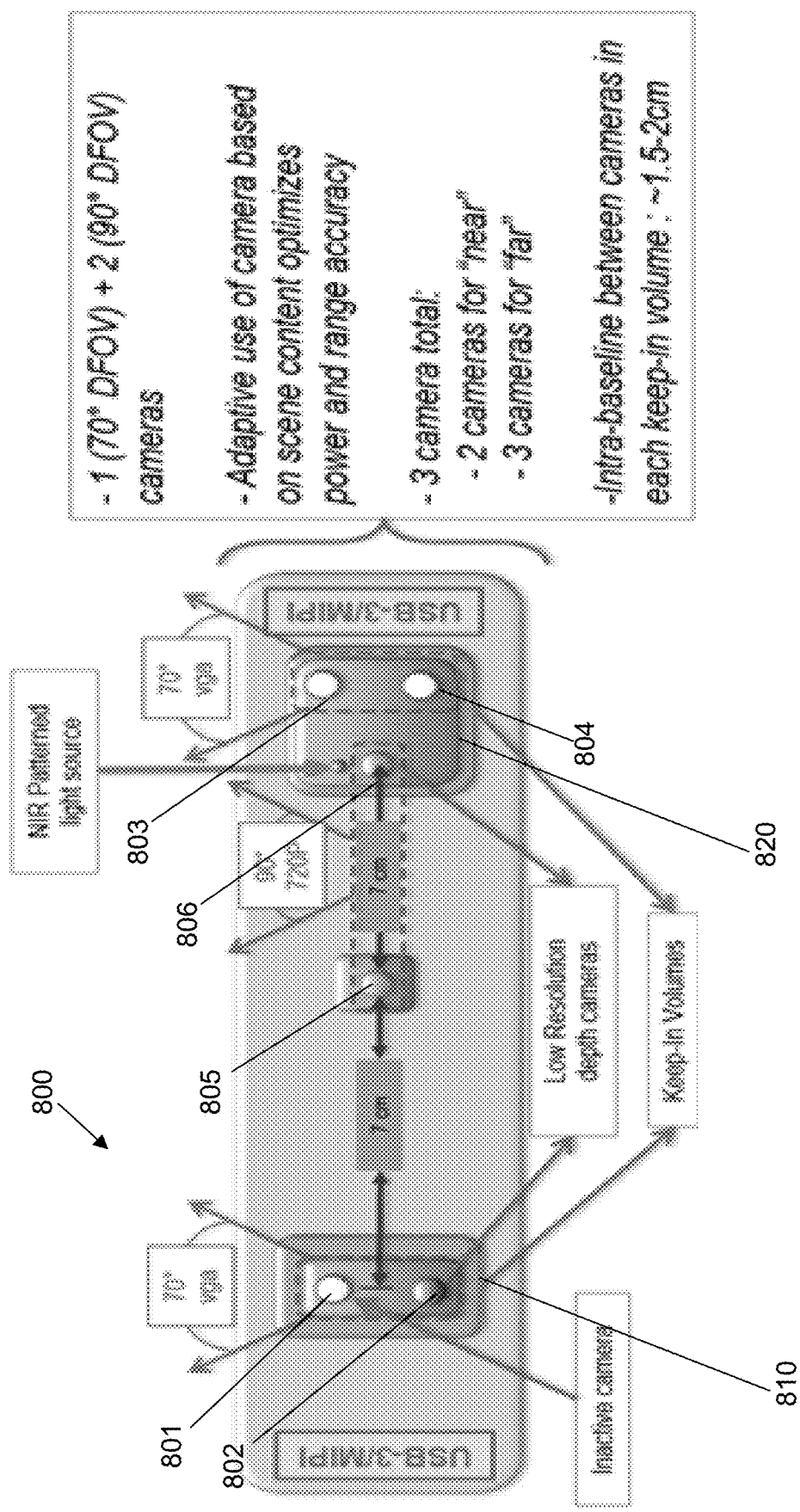
FIG. 8 illustrates a camera array with 3 cameras active in accordance with an embodiment of the invention.

In this mode a total of 3 cameras is used as illustrated in FIG. 8. Only one camera, camera 802, for ensuring a large baseline (e.g. 14 cm) is retained as seen in FIG. 8. Cameras 805, 806 are suitable for the near field (avoiding the vergence problem for normal field of views as discussed above), and behave like a stereo system, while camera 802 may be used in far field operation, in conjunction with cameras 805 and 806. The additional trade-off in this operation mode, is that the occlusion coverage by the cameras is generally poorer than in MODE 2 of FIG. 7, where it matters most, i.e., for close objects ("near" range). Cameras 805, 806 form a stereo system, with its known depth estimation limitations (higher estimation noise, severe occlusion issues). These can be addressed to some degree in a subsequent processing stage.

FIG. 9 provides a table that summarizes the different configurations and modes of operations discussed above and itemizes the interface (e.g. MIPI lanes) on the illustrated processing systems as well as the compute and power savings possible.

Additional Camera Array Architectures

In a number of embodiments, camera arrays utilize different types of cameras, and camera array configurations, including a variety of baselines between cameras, as would be appropriate for different VR/AR/MR applications. While a great variety of possibilities exist for the construction of a camera array for use in a VR/AR/MR system, a number of examples are discussed below to illustrate various design considerations specific to VR/AR/MR systems and potentially relevant to other applications that can advantageously influence the performance of the camera array.

Figure 10:
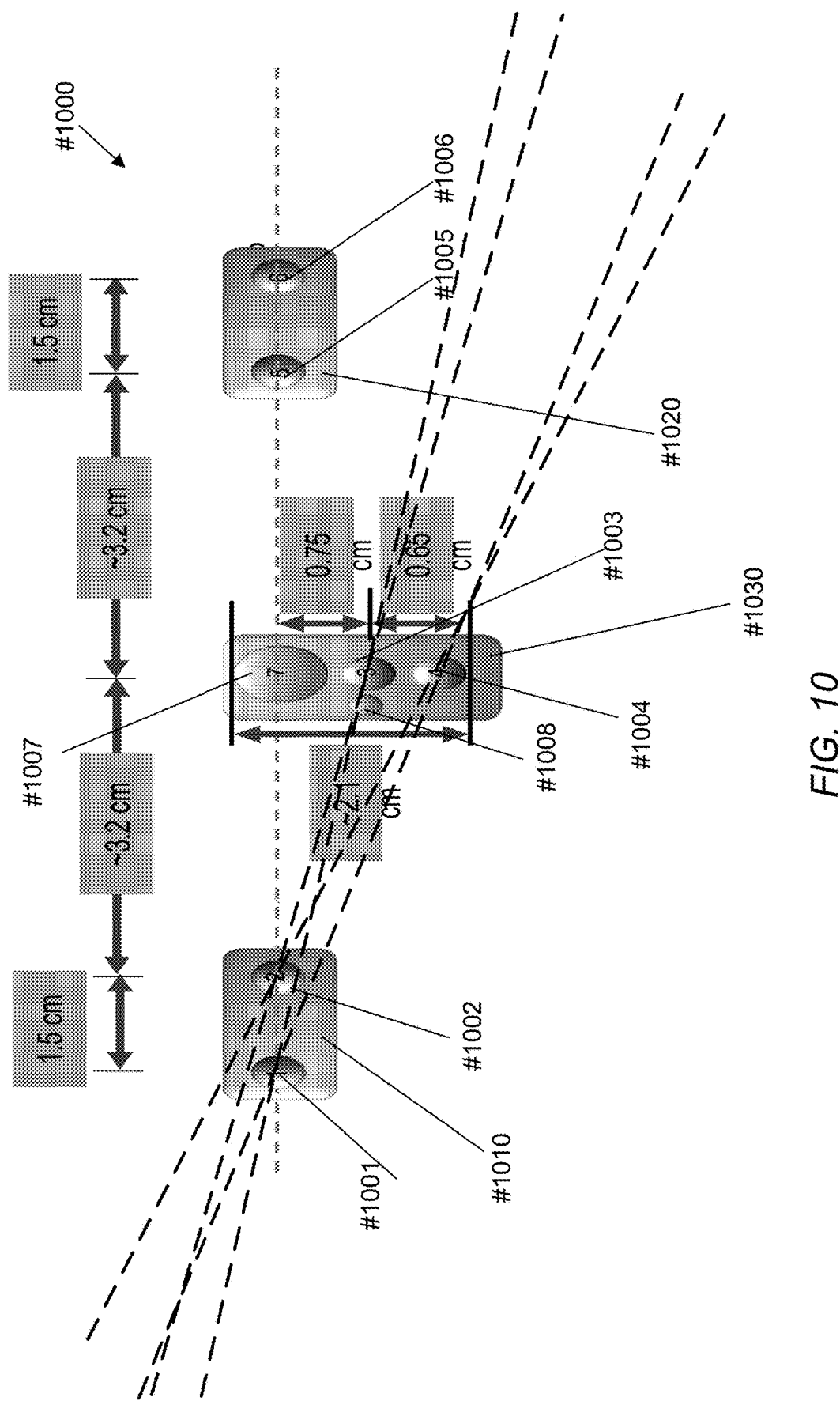
FIG. 10 illustrates a camera array incorporating a linear array of four cameras positioned above a vertical array of two cameras including a reference camera in accordance with an embodiment of the invention.

A camera array incorporating a linear array of four cameras positioned above a vertical array of two cameras including a reference camera in accordance with an embodiment of the invention is illustrated in FIG. 10. In the illustrated embodiment, various cameras 1001-1007 and an illumination system 1008 are positioned to be incorporated within the frame of an AR/VR/MR system in a manner that results in each camera sharing an epipolar line with the reference camera aligned at a different angle with respect to the epipolar lines of the other alternate view cameras. The left side 1010 cameras 1001 and 1002 are aligned along a horizontal axis as a 1×2 subarray of cameras. The space between these cameras is approximately 1.5 cm. The right side 1020 cameras 1005 and 1006 are also positioned similar to the left side 1010 with approximately the same spacing (~1.5 cm). The middle 1030 cameras 1003, 1004, and 1007 are aligned vertically, with a distance of approximately 0.75 cm between camera 1007 and 1003, a distance of approximately 0.65 cm between camera 1003 and 1004, and a distance of approximately 2.1 cm between camera 1007 and 1004. Furthermore, the space between the middle cameras 1030 and the right side 1010 is approximately 3.2 cm, and the same for the left side (~3.2 cm). Furthermore, all of the cameras, except a high resolution imaging camera 1007, are of a same type, and the high resolution imaging camera 1007 may be a different type (as illustrated by the larger lens) for the purpose of capturing full color images of a scene. In several embodiments, camera 1003 acts as a reference camera for the generation of depth maps and an initial depth map is then warped into the viewpoint of the high resolution imaging camera 1007. The depth map can also be warped into a viewpoint from which AR/VR displays are rendered to facilitate Z-keying. In some embodiments, the high resolution imaging camera 1007 may be the reference camera. In certain embodiments, as described further below, the reference camera 1007 may be an interchangeable camera, such as a camera from a user's smartphone that is placed within the camera array imaging architecture.

In the illustrated embodiment, the illumination system 1008 is positioned near the reference camera 1007. In some embodiments, positioning the cameras symmetrically around the illumination system 1008 and locating the illumination light source as close as possible to the reference camera 1007 may help reduce the likelihood of occlusions of the projected texture in portions of the image visible to the reference camera. In other embodiments, multiple light sources can be provided to address occlusions of the projected pattern by foreground objects.

In some embodiments, camera 1001-1006 may each be of size 6.5 mm×6.5 mm (global shutter 3μ pixels) and the main reference camera 1007 may be of size 8.5 mm×8.5 mm. Furthermore, different cameras may be located along different epipolar lines, several examples of which are illustrated by the dashed lines between cameras 1001 and 1003, 1004 and cameras 1002 and 1003, 1004. Accordingly, corresponding pixels in the set of images captured by the cameras in the array of cameras are located on different epipolar lines. Depth estimates can be unreliable where regions along an epipolar line are self-similar. When disparity searches are performed along multiple epipolar lines aligned at different angles with respect to each other, the likelihood that a pattern will be self-similar at each of the corresponding locations along the different epipolar lines decreases with each additional epipolar line searched. A striking example may be illustrated by considering the quality of the depth map computed from 4 cameras while varying the specific cameras that are used. Thus, if one were to look at the depths computed from the cameras 2, 3, 4, and 5 and compare it with the depths computed from cameras 1, 3, 4, and 6 one would find that the depth precision (i.e. accuracy) as a function of object distance is improved in the latter group (i.e. cameras 1, 3, 4, and 6) on account of the larger baselines involved. However, the noise in the depth map may be better in the former group (i.e. cameras 2, 3, 4, and 5) on account of the larger variation in angular direction of the various epipolar lines involved. The specific tradeoff between width of baseline and variation between epipolar line angular directions in camera arrays (and particularly in smaller camera arrays) may be typically dependent upon the requirements of a given application.

In certain embodiments, the baseline between the camera arrays is larger than the baseline between cameras within a camera array. Accordingly, disparity observed along a first epipolar line will be significantly greater than disparity observed along a second (perpendicular) epipolar line. Therefore, a projected pattern can be utilized that incorporates a smaller spatial pattern features size in a direction corresponding to the second epipolar line. For example, a pattern with a larger horizontal spatial pattern feature can than the vertical spatial pattern feature size can be utilized with a camera array in which a wide horizontal baseline exists between a pair of two-dimensional arrays of cameras and the largest vertical baseline between cameras in a two-dimensional array of cameras is significantly smaller than the horizontal baseline. In other embodiments, differences in spatial pattern feature size can be employed along different axes within a projected pattern as appropriate to the requirements of a specific application.

Additional Camera Arrays

Figure 11:
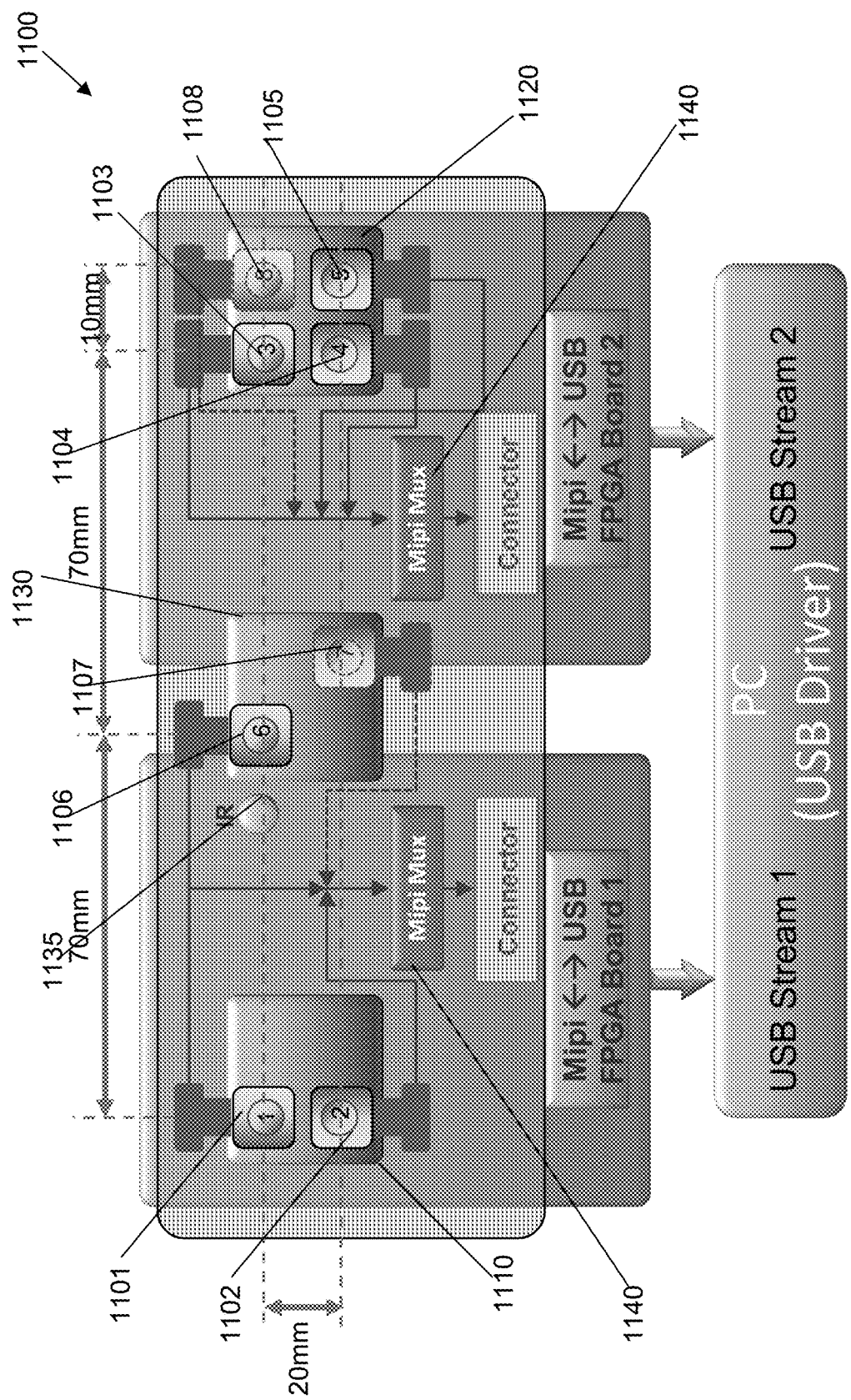
FIG. 11 illustrates a camera array suitable for use in an AR/VR/MR headset in accordance with an embodiment of the invention.

Another camera array suitable for use in an AR/VR/MR headset in accordance with an embodiment of the invention architecture is illustrated in FIG. 11. The multi-baseline camera array 1100 includes a left subarray of cameras 1110, a right subarray of cameras 1120, a middle subarray of cameras 1130 and an illumination system 1135. The left subarray of cameras 1110 includes two cameras 1101, 1102 aligned along a vertical axis. The right subarray of cameras 1120 includes four cameras 1103, 1104, 1105 and 1108 aligned as a 2×2 array of cameras. The middle subarry of cameras 1130 includes two cameras, 1106 and 1107, positioned along a diagonal axis. In some embodiments, the middle camera 1106 or 1107 may be used as the reference camera. Accordingly, the illumination system 1135 is positioned as close to the reference camera 1106 as possible given other layout constraints in order to reduce the likelihood of occlusions of the projected texture from the illumination system in portions of the image visible to the reference camera 1106. As with many of the camera arrays described above, the subarrays can be mounted to rigid substrates that preserve the spacing and orientation of cameras within a subarray despite the fact that the spacing and orientation of the subarrays may vary during operation.

In some embodiments, cameras 1108 and 1107 (shown in dotted lines along with their connections) may not be populated but can be placed for possible experimentations and/or for increased depth estimation precision. As illustrated, the distances separating the top row cameras (1101, 1106, 1103, 1109) with the bottom row cameras (1102, 1107, 1104, and 1105) is approximately 20 mm. The distance between camera 1101 and 1106 is approximately 70 mm. The distance between camera 1106 and 1103 is approximately 70 mm. The distance between cameras 1103, 1104 and cameras 1108, 1105 is approximately 10 mm respectively. Although specific distances have been illustrated, any of a variety of different distances may be specified for a multi-baseline camera array architecture as appropriate to the requirements of specific applications. In many embodiments, the cameras are spaced so that at least two of the cameras are spaced wider apart than a user's eyes. In a number of embodiments, the cameras are spaced so that two cameras are spaced wider apart than the user's eyes and a third reference camera is located between the users eyes. In certain embodiments, the cameras are spaced so that a subarray of at least two cameras is rigidly mounted to the left of a user's left eye, and a subarray of at least two cameras is rigidly mounted to the right of the user's right eye. In a still further embodiments, the cameras are spaced so that a first subarray of at least two cameras is rigidly mounted to the left of a user's left eye, a second subarray of at least two cameras is rigidly mounted to the right of the user's right eye, and a third subarray of at least two cameras is rigidly mounted between the user's two eyes. In still another embodiment, all of the cameras in the first, second, and third subarrays possess the same imaging characteristics. In another further embodiment, at least two of the subarrays include cameras having different imaging characteristics.

Referring again to FIG. 11, the image data from each camera 1101-1108, may be provided to a multiplexer 1140. In some embodiments, the system may activate one multiplexer 1140 source at a time to allow static scene capture. Certain embodiments may simultaneously active both multiplexer 1140 sources.

Figure 12:
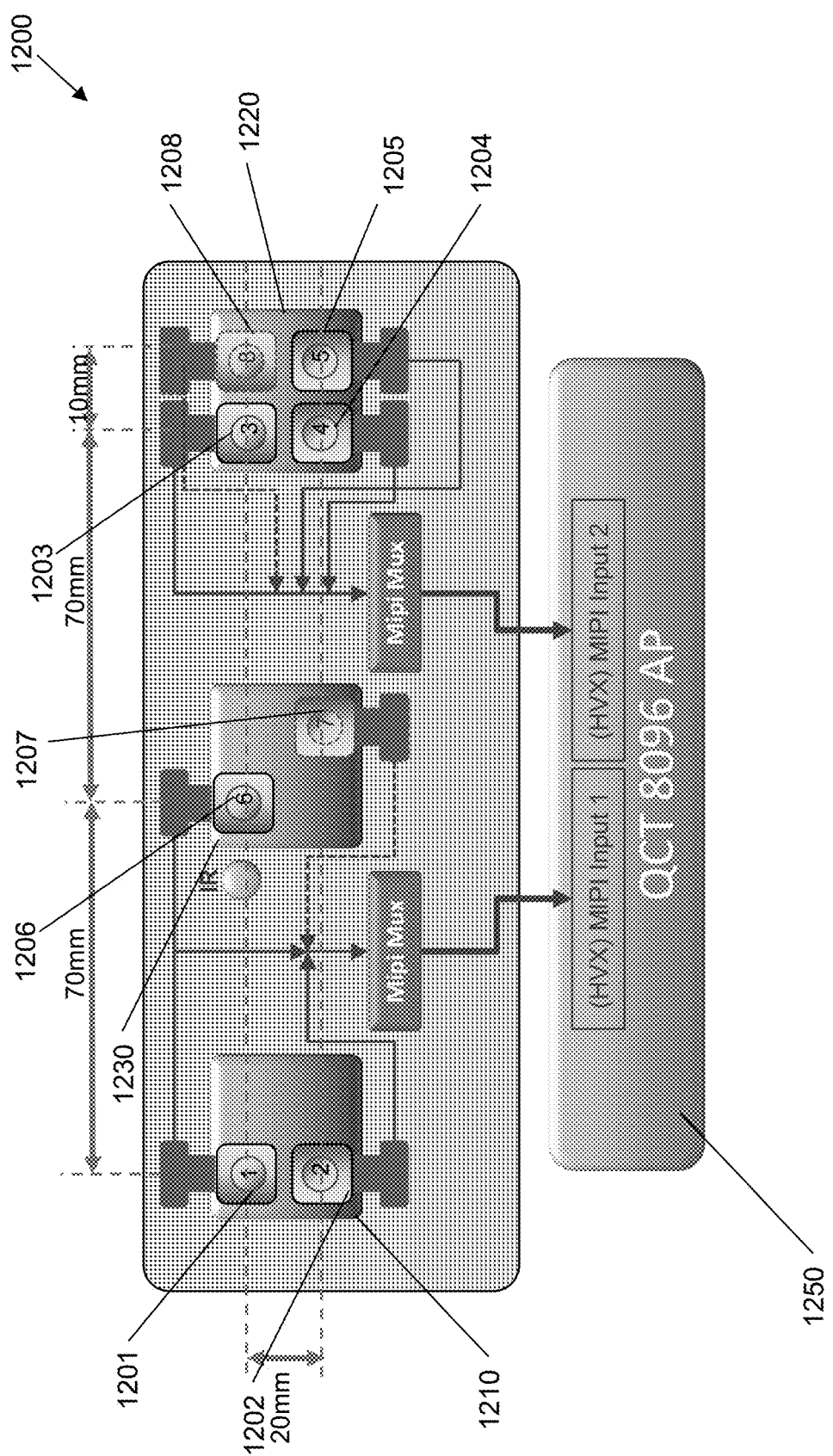
FIG. 12 illustrates a multi-baseline camera array using a Qualcomm™ 820 system in accordance with an embodiment of the invention.

This data may then be provided to a computing system through various interfaces such as (but not limited to) USB interfaces. The computing system could be a personal computer, a mobile phone or tablet computer, a VR/AR/MR headset, and/or a dedicated computing platform. A multi-baseline camera array using a Qualcomm™ 820 system in accordance with an embodiment of the invention is illustrated in FIG. 12. In particular, FIG. 12 illustrates a similar camera array structure 1200 as the camera array 1100 shown in FIG. 11, but using a QCT 9096 AP from the Qualcomm™ 820 processing platform. Although FIG. 12 illustrates a multi-baseline camera array architecture using a Qualcomm™ 820 platform, any of a variety of different platforms may be utilized as appropriate to the requirements of specific applications in accordance with embodiments of the invention.

Figure 13:
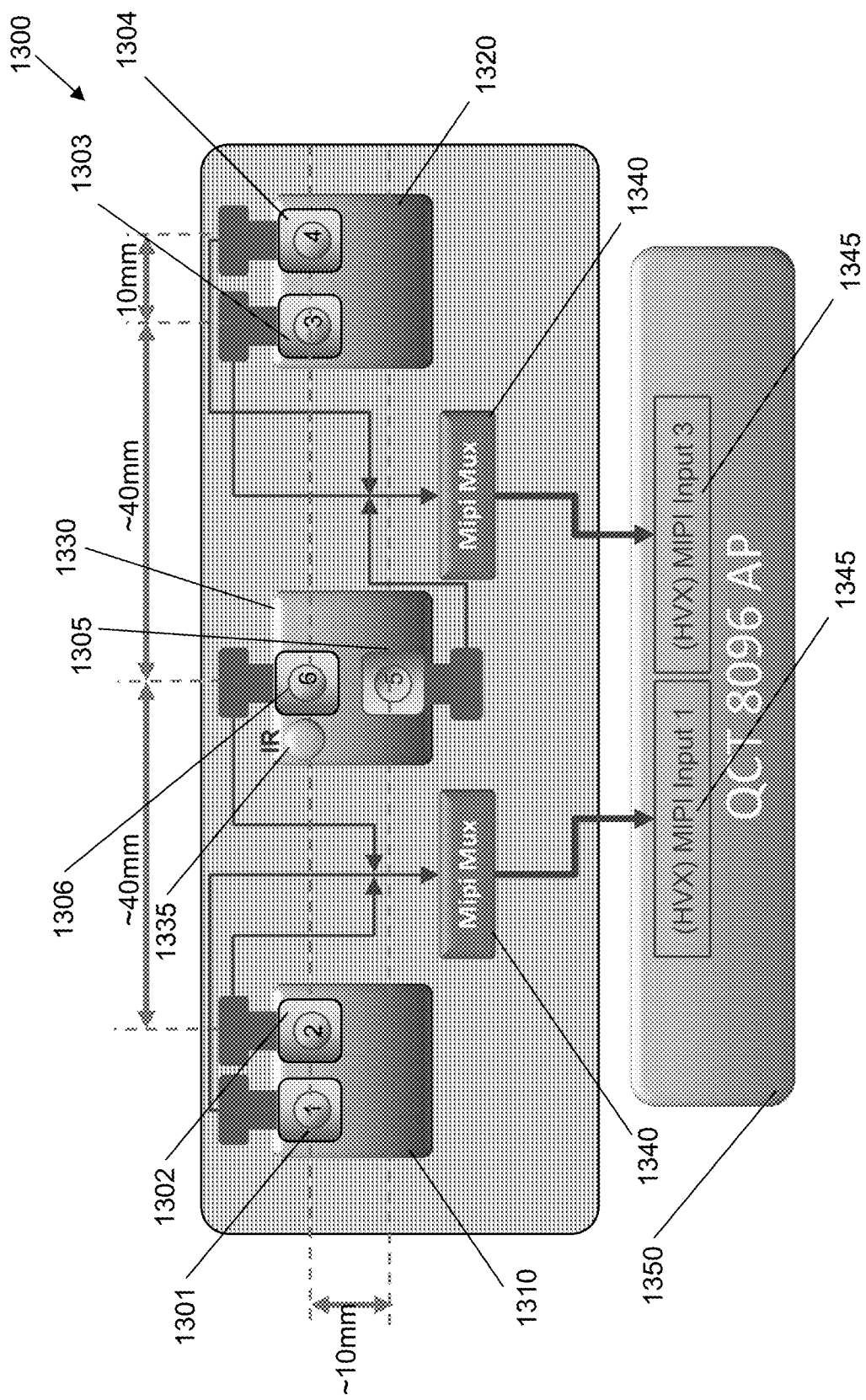
FIG. 13 illustrates se of six cameras in a multi-baseline camera array that implements an image processing pipeline on a Qualcomm™ 820 platform in accordance with an embodiment of the invention.

As can readily be appreciated, a camera array similar to the camera array shown in FIGS. $11 and 12 can be constructed with fewer cameras. Use of six cameras in a multi-baseline camera array that implements an image processing pipeline on a Qualcomm™ 820 platform in accordance with an embodiment of the invention is illustrated in FIG. 13. As illustrated, the multi-baseline camera array architecture 1300 includes a left subarray of cameras 1310 that includes two cameras 1301 and 1302 aligned along a horizontal axis. The right subarray of cameras 1320 includes two cameras 1303 and 1304 aligned along a horizontal axis. The middle subarray of cameras 1330 includes two cameras 1305 and 1306 aligned along a vertical axis. In some embodiments, camera 1306 may be a reference camera. The system also includes an illumination system 1335 positioned close to the reference camera 1306. The distance separating the left subarray of cameras 1301, 1302, right subarray of cameras 1303, 1304 and the reference camera 1306, respectively, may be approximately 40 mm. The distance separating cameras 1301, 1302 may be approximately 10 mm. The distance separating cameras 1303, 1304 may also be approximately 10 mm. The data from the cameras 1301-1306 can be provided to one of the two multiplexers 1340, where the image data from multiple cameras is combined into a single stream of data that is provided to one of the two image processors provided in the QCT 8096 AP (alternatively referred to as the Qualcomm 820 SOC). The Qualcomm™ 820 system on chip, incorporates two image processors, a digital signal processor (DSP), a graphics processing unit (GPU), and central processing unit (CPU). In other embodiments, the Qualcomm 820 SOC may be replaced with a custom hardware that incorporates custom RTL implementing the entire depth pipeline of the four stages mentioned above. Although FIG. #13 illustrates using a multi-baseline camera array with six cameras and a single illumination system positioned near the reference camera on a Qualcomm 820 platform, any of a variety of cameras, illumination systems, and/or platforms may be utilized as appropriate to the requirements of specific applications. Example of multi-baseline camera arrays that include multiple illumination systems in accordance with embodiments of the invention are described below.

Comparison of Depth Estimation Performance

Figure 14:
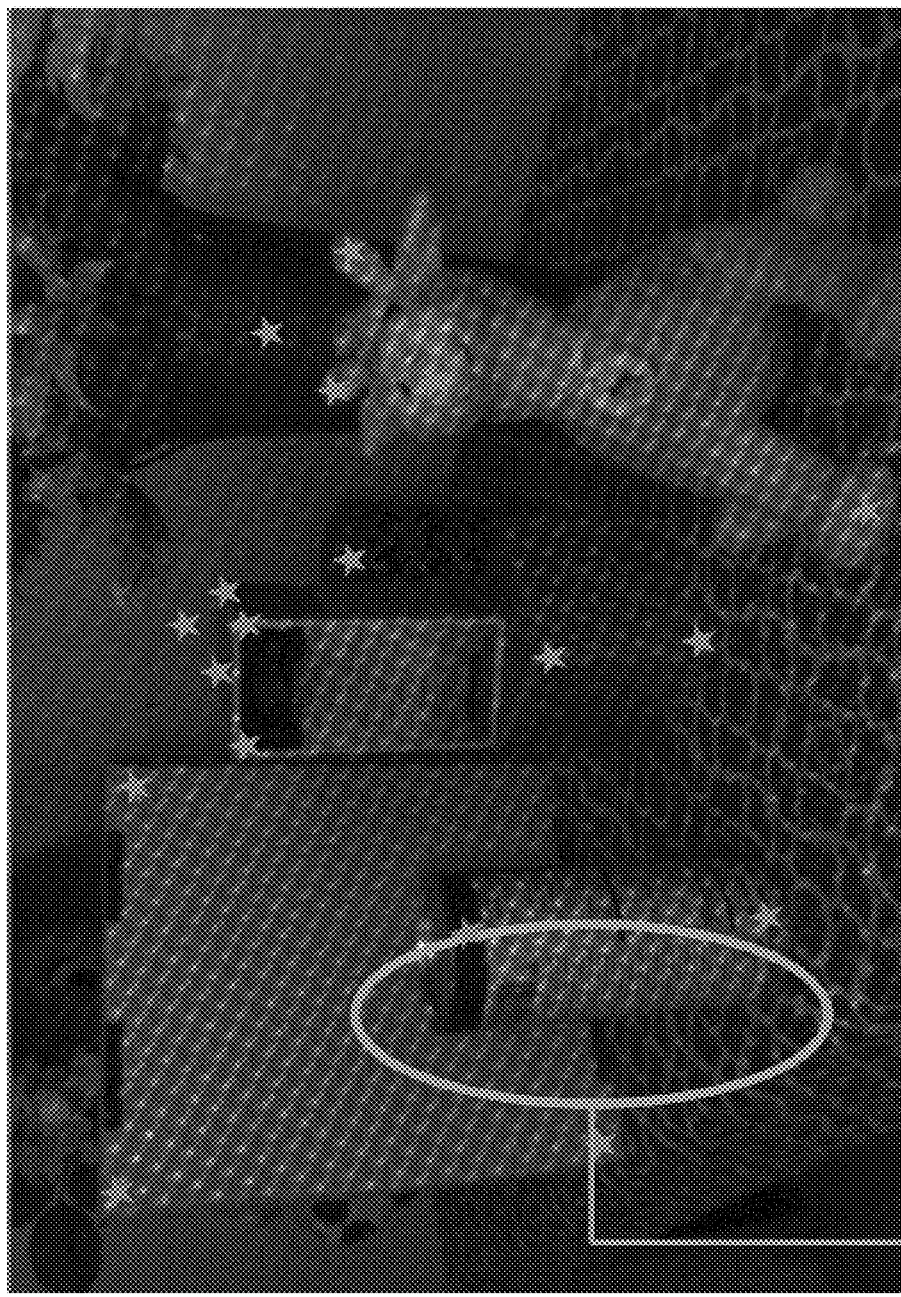
FIG. 14 illustrates a monochrome image captured of a scene on which a Near-IR pattern is projected by a camera that acts as a reference camera within an array cameras similar to the array camera shown in FIG. 12.
Figure 15:
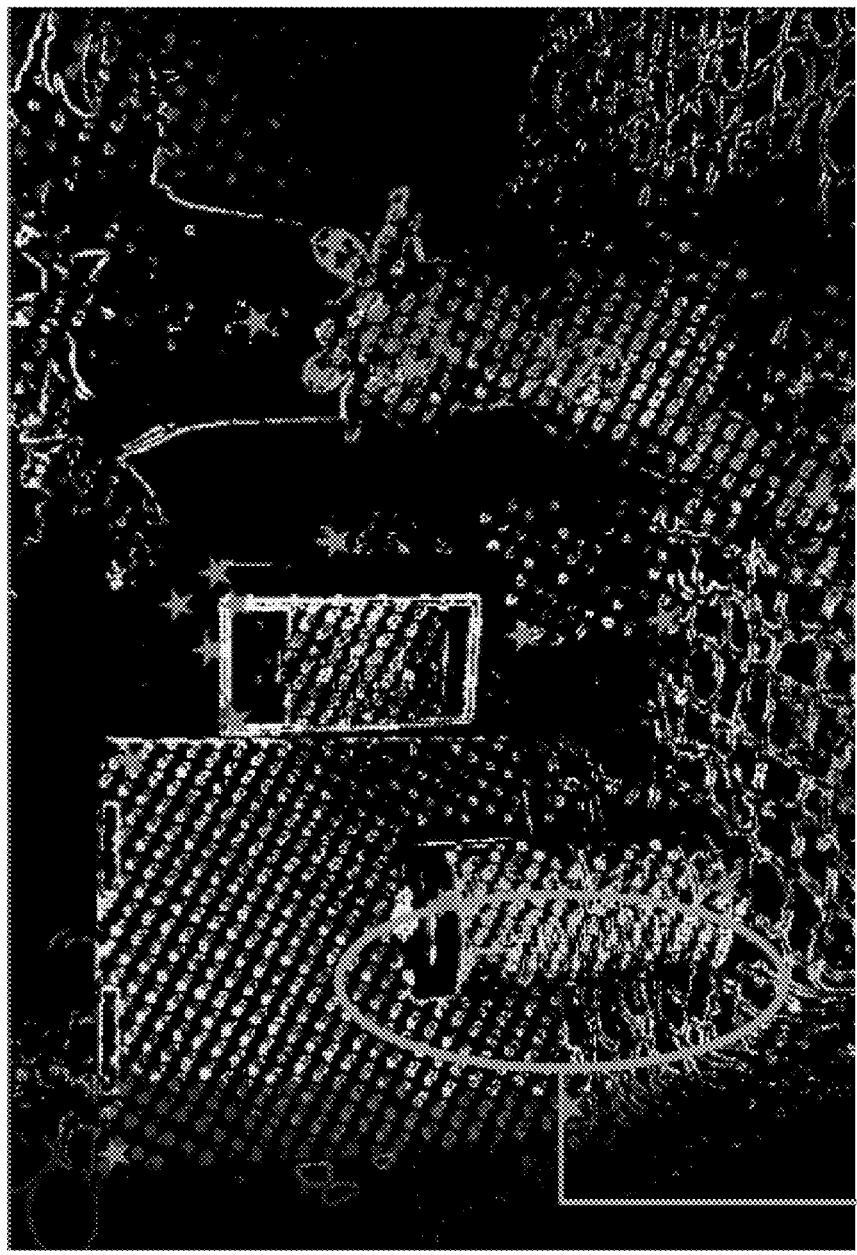
FIG. 15 illustrates a depth map produced by generating depth estimates from a set of images captured by the camera array and filtering the depth estimates based upon the confidence of the depth estimates.
Figure 16:
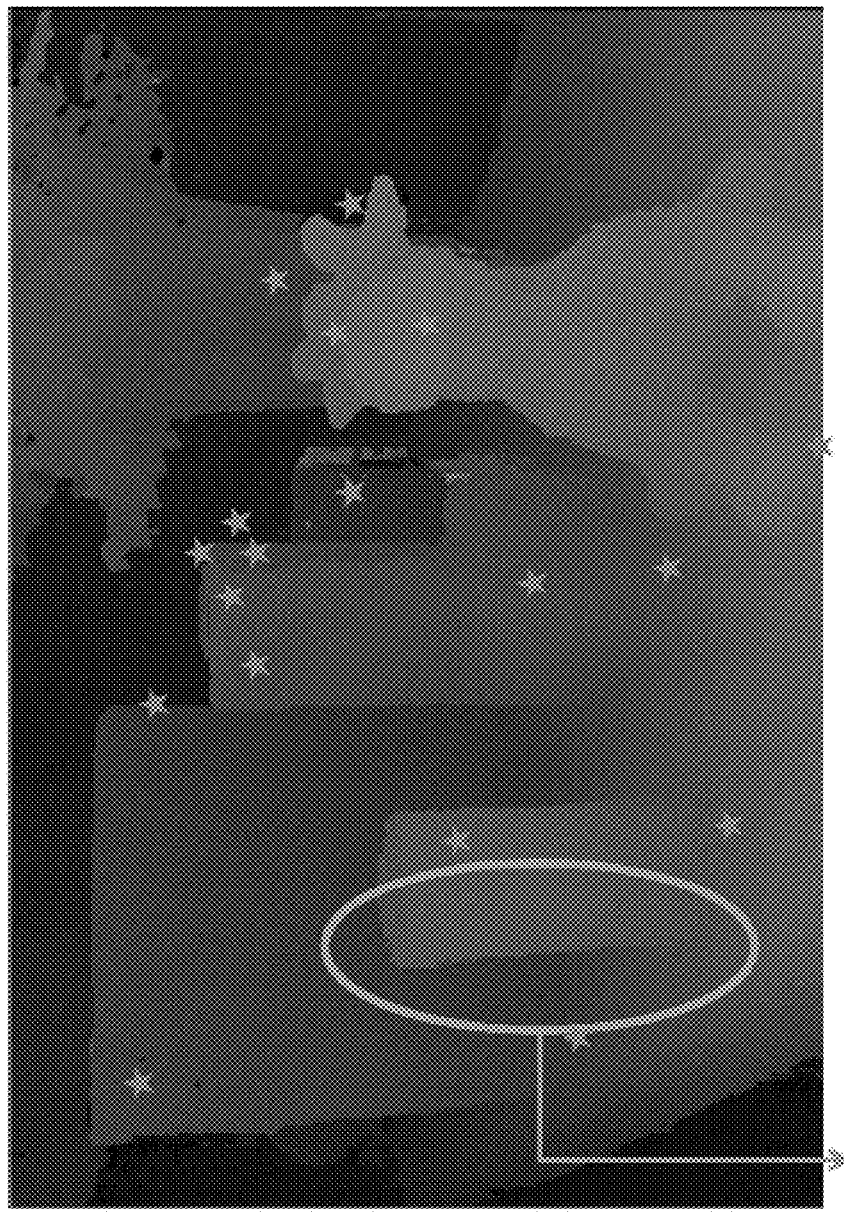
FIG. 16 illustrates a regularized depth map generated using the high confidence depth estimates shown in FIG. 15.
Figure 17:
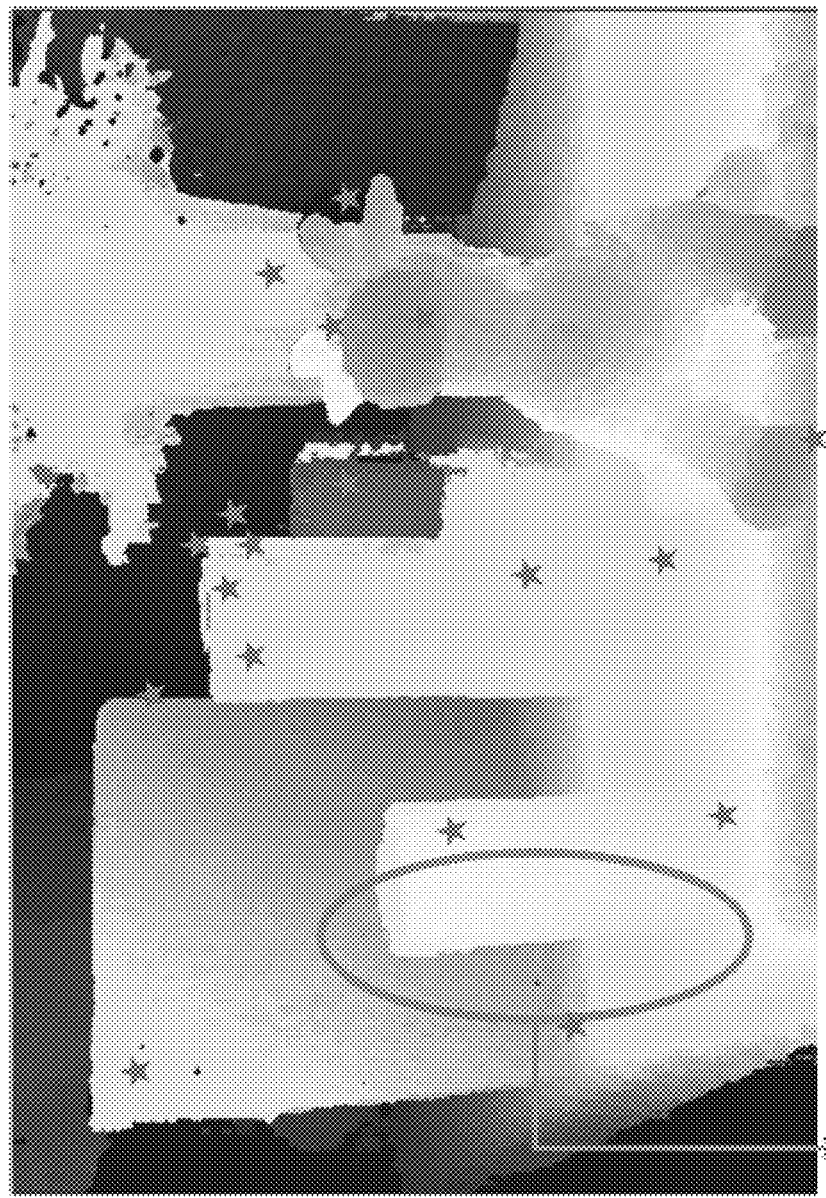
FIG. 17 illustrates the depth map of FIG. 15 with depth shown in false color, with red indicating an object is closer and blue further.
Figure 18:
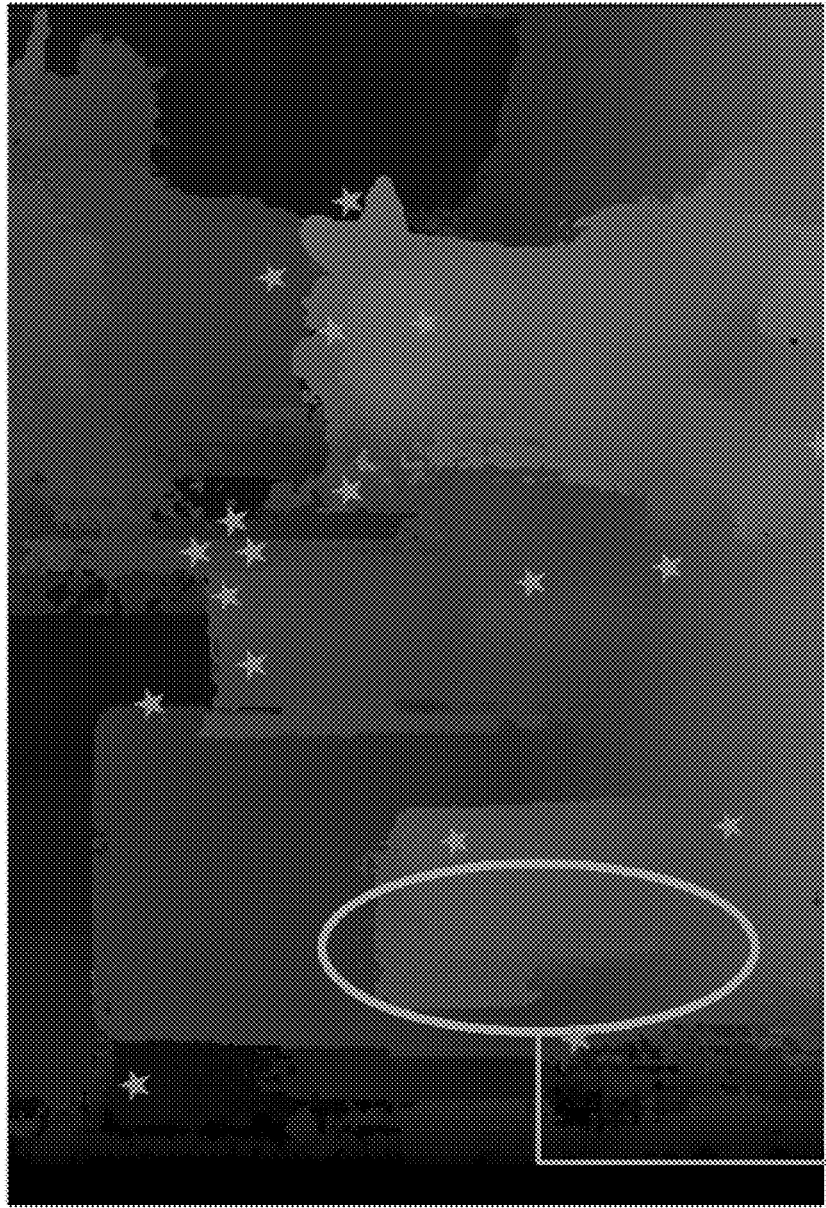
FIG. 18 is provided which illustrates the depth map that results by performing similar processes to those used to generate the depth maps shown in FIGS. 15 and 17 (with exceptions such as the inability of a stereo pair to perform occlusion handling) to produce a depth map from a single pair of cameras in the camera array.
Figure 19:
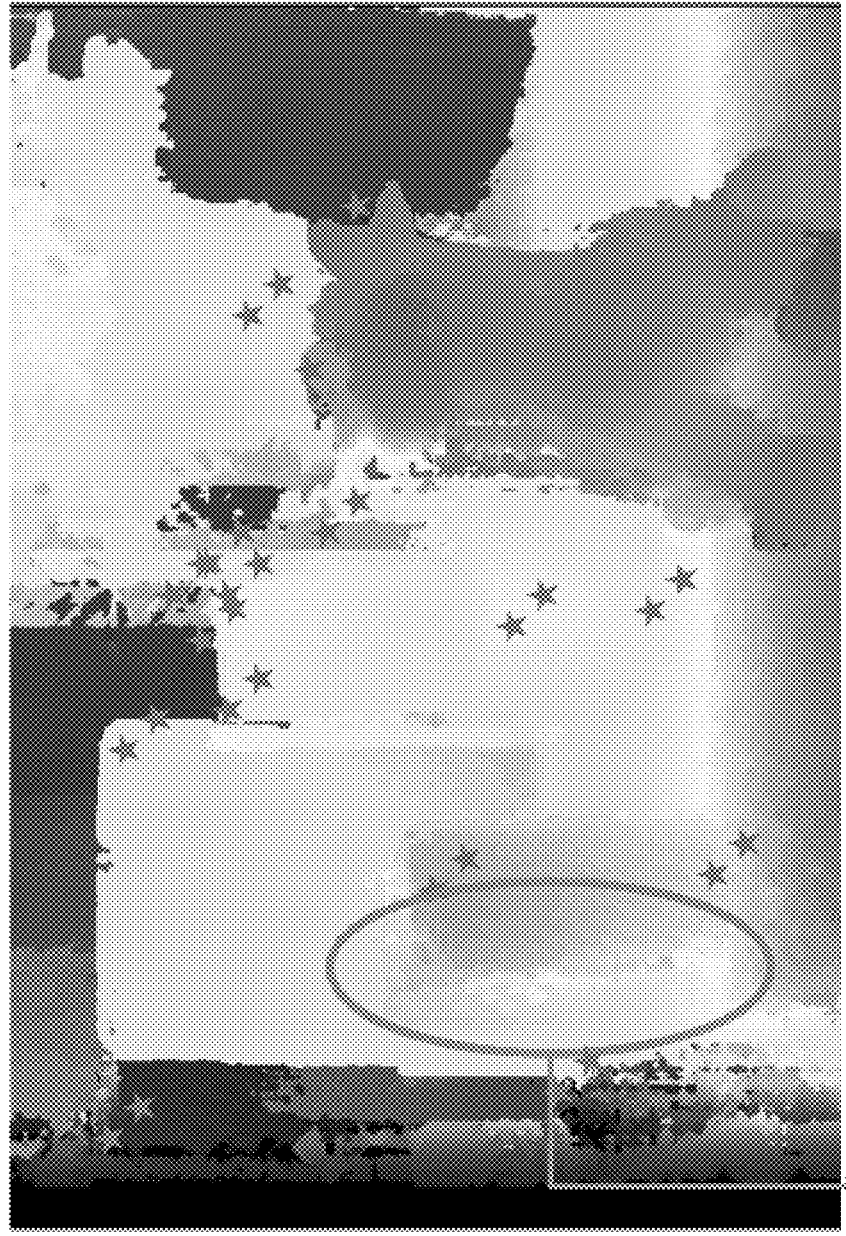
FIG. 19 illustrates a stereo dense depth map shown in false color with red being closer and blue, further.
Figure 20:
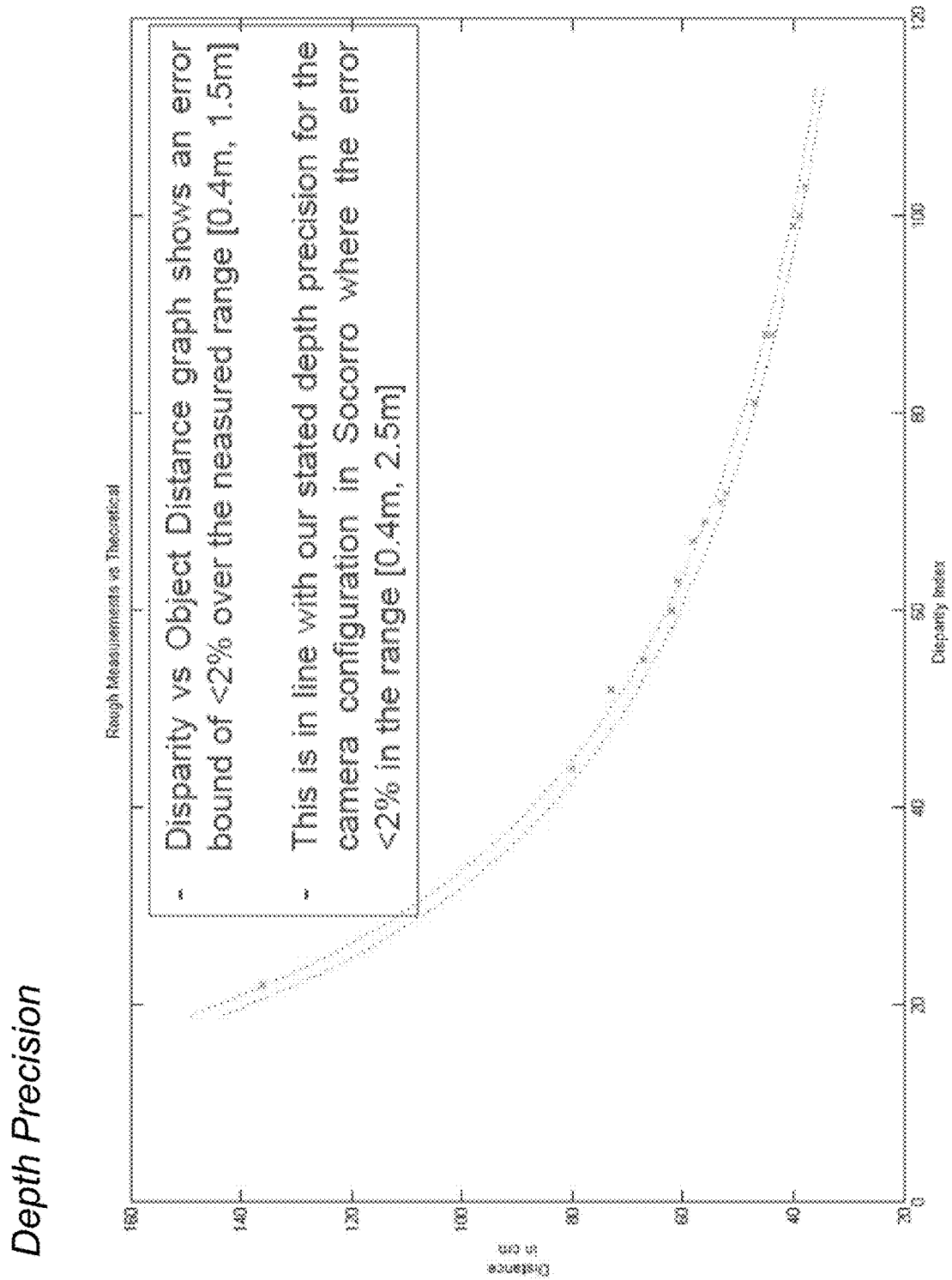
FIG. 20 provides a depth precision graph for a camera array in accordance with an embodiment of the invention.

The benefits of using multiple cameras when performing depth estimation relative to a stereo pair of cameras can be appreciated by reviewing FIGS. 14-19. FIG. 14 is a monochrome image captured of a scene on which a Near-IR pattern is projected by a camera that acts as a reference camera within an array cameras similar to the array camera shown in FIG. 12. As indicated, there is a foreground object with potential occlusion boundaries. FIG. 15 illustrates a depth map produced by generating depth estimates from a set of images captured by the camera array and filtering the depth estimates based upon the confidence of the depth estimates. As can readily be appreciated, use of the projected Near-IR pattern yields a large number of high confidence depth estimates distributed throughout the field of view of the reference camera and across the complete range of depths visible within the scene. FIG. 16 illustrates a regularized depth map generated using the high confidence depth estimates shown in FIG. 15. As illustrated, the foreground object has clean edges with no-occlusion artifacts due to the multi-baseline arrays. FIG. 17 illustrates the same depth map with depth shown in false color, with red indicating an object is closer and blue further. This is a regularized depth, as such, the foreground object has clean edges with no-occlusion artifacts due to the multi-baseline arrays. In order to appreciate the benefit that providing additional cameras that enable disparity searches to be conducted with respect to: more than two images; images captured by cameras having different baselines; and/or cameras having epipolar lines that are not parallel, FIG. 18 is provided which illustrates the depth map that results by performing similar processes to those used to generate the depth maps shown in FIGS. 15 and 17 (with exceptions such as the inability of a stereo pair to perform occlusion handling) to produce a depth map from a single pair of cameras in the camera array. As indicated, the edges of foreground objects have significant occlusion artifacts when only a single stereo pair of cameras is used. FIG. 19 illustrates a stereo dense depth map shown in false color with red being closer and blue, further. As illustrated, the edges have significant occlusion artifacts when only stereo cameras are used. While the significant improvements in depth estimation precision (particularly in occlusion zones near foreground objects) is readily apparent from a comparison of the images shown in FIGS. 15 and 17 with the images shown in FIGS. 19 and 20, the true extent of the depth estimation precision achievable using a multi-baseline array camera that incorporates projected illumination can be appreciated by reviewing FIG. 20. FIG. 20 provides a depth precision graph. In particular, the disparity vs. object distance graph shows an error bound of <2% over the measured range [0.4 m, 1.5 m].

While the results described above are with respect to image data captured by a camera array similar to the camera array illustrated in FIG. 12, similar depth estimation precision can be achieved using many of the camera arrays described herein. As noted above, the specific configuration of a camera array utilized in an application involving high depth estimation precision across an operating range of depths and/or field of view is largely dependent upon the requirements of a given application.

Multi-Baseline Depth Estimation

Figure 21:
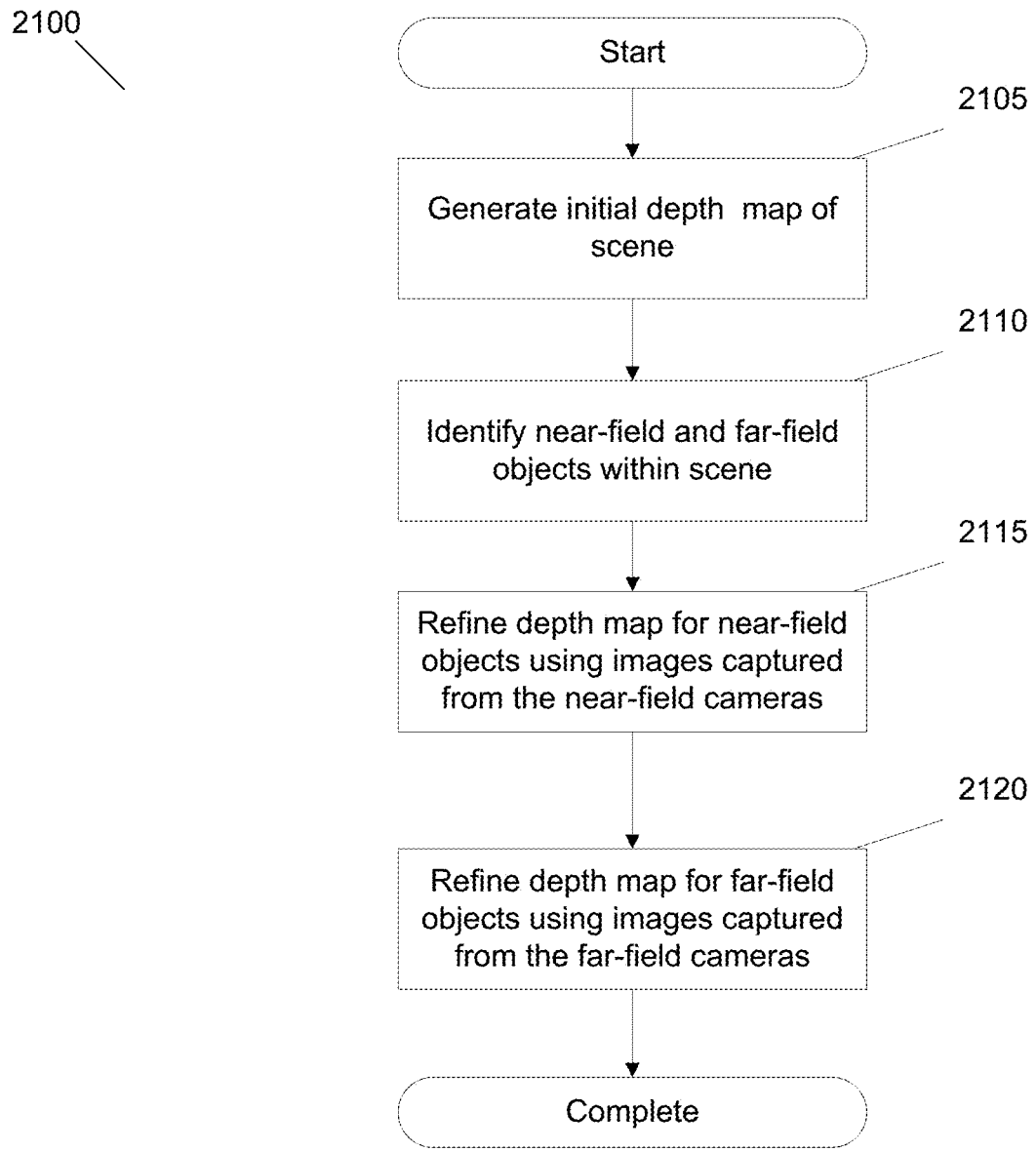
FIG. 21 conceptually illustrates a process for computing a depth map of a scene using a multi-baseline camera array in accordance with an embodiment of the invention.

As described above, multi-baseline camera arrays may work over a fairly large depth of field (e.g., from 0.15 m to 4 m) since the depth of far-field objects such as those with a distance greater than a certain threshold (e.g., 1 m to 4 m) may be computed using a larger operating baselines between cameras while the depth of near-field objects, including objects with a distance below a certain threshold (e.g. below 1 m) may be computed using a smaller operating baseline between cameras. A process for computing a depth map of a scene using a multi-baseline camera array in accordance with an embodiment of the invention is illustrated in FIG. 21. The process 2100 generates 2105 initial depth estimates and/or an initial depth map. In many embodiments, the process generates a depth map for the depth to objects within a scene captured by array cameras using processes described in U.S. Pat. No. 8,619,082, the relevant disclosure from which is incorporated by reference above.

Based upon initial depth estimates, the process identifies 2110 near-field and far-field objects and portions of the scene within the captured scene. In some embodiments, near-field objects have a distance below a certain threshold (e.g., less than 1 m) and far-field objects have a distance at or above the certain threshold distance (e.g., greater than or equal to 1 m). The specific thresholds defining near field and far field are largely dependent upon the configurations of the cameras in the array (e.g. field of view, baselines) and the requirements of a given application. The process can (optionally) refine 2115 the depth estimates for near-field objects and/or portions of the scene using images captured from the near-field cameras in the multi-baseline camera array. The process can (optionally) refine 2120 the depth map for far-field objects and/or portions of the scene using images captured from the far-field cameras in the multi-baseline camera array. The process then completes.

Although specific processes for generating depth maps with respect to near-field and far-field objects are described above, any of a variety of processes incorporating the camera array structures and imaging techniques outlined above can be utilized to generate depth estimates in accordance with embodiments of the invention. For example, camera arrays in accordance with many embodiments of the invention can vary depth estimation precision within different regions of the field of view of the camera array and/or at different depths from the camera array by varying the sampling of depth estimates and/or the spatial resolution with which depth is sampled. The manner in which depth estimation is performed in accordance with various embodiments of the invention is typically dependent upon the requirements of a given application.

Camera Arrays Incorporating Multiple Illumination Systems

Figure 22:
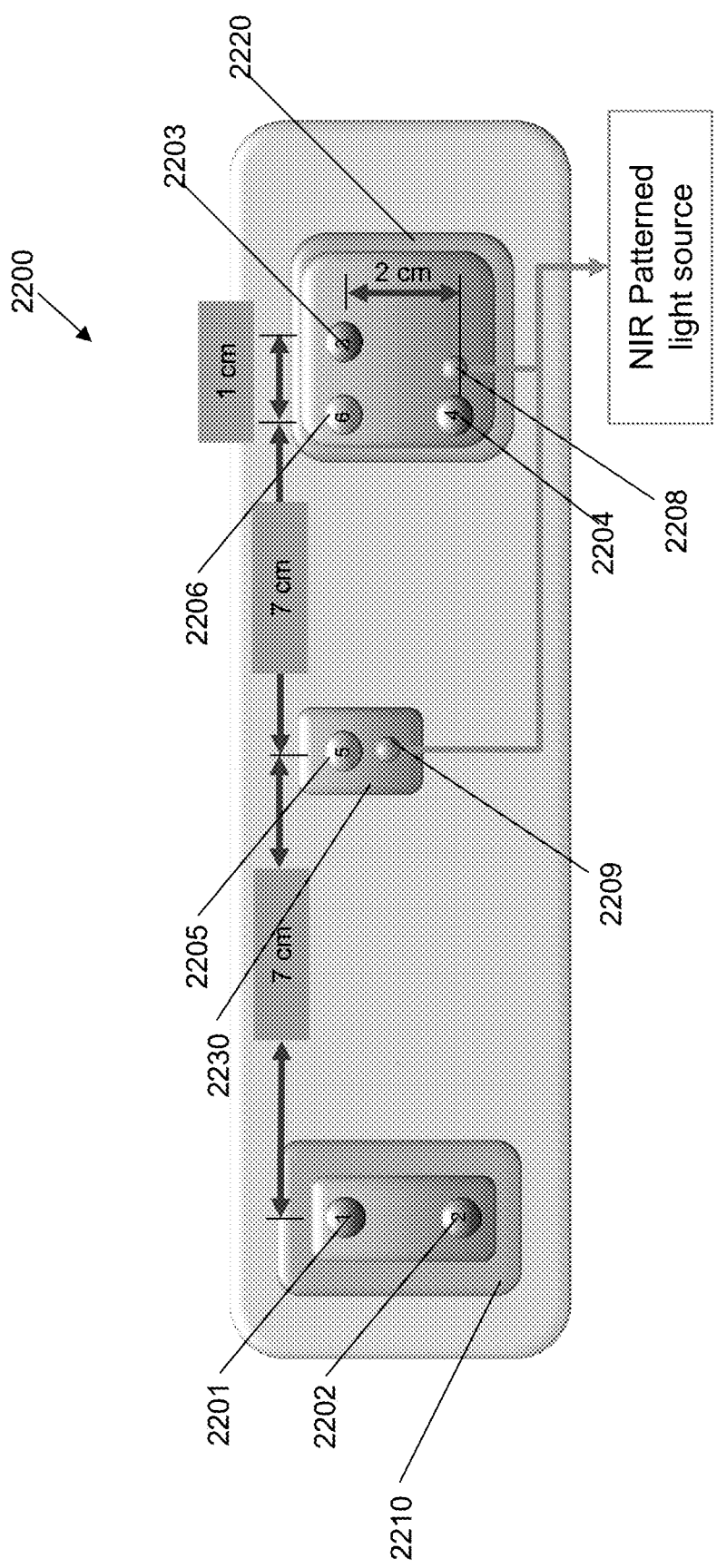
FIG. 22 illustrates a multi-baseline camera array that uses two Near-IR patterned light sources for use in an AR/VR/MR headset in accordance with an embodiment of the invention.

Some embodiments of the invention may utilize several illumination systems for use in determining depth to objects in a scene. A multi-baseline camera array that uses two Near-IR patterned light sources for use in an AR/VR/MR headset in accordance with an embodiment of the invention is illustrated in FIG. 22. In particular, the camera array includes a left subarray of cameras 2210 that includes two cameras 2201, 2202 aligned along a vertical axis, a right subarray of cameras 2220 that includes three cameras 2203, 2204, 2206. Cameras 2203 and 2206 are aligned along a horizontal axis, cameras 2206 and 2204 along a vertical axis, and cameras 2204 and 2203 along an angular (non-zero) axis. A middle subarray of cameras 2230 includes a single reference camera 2205 positioned near an illumination light source 2209. A second illumination light source 2208 is positioned near camera 2204. Using multiple illumination light sources can increase the accuracy for determining the depth of objects in a scene. The distance between the reference camera 2205 and cameras 2201 and 2206 is approximately 7 cm. Furthermore, the distance between cameras 2206 and 2203 is approximately 1 cm, and the distance between cameras 2206 and 2204 is approximately 2 cm. Although FIG. 22 illustrates a multi-baseline camera array using two illumination light sources, any of a number of different illumination light sources may be utilized as appropriate to the requirements of specific applications in accordance with embodiments of the invention.

AR/VR/MR Headsets Incorporating Removable Cameras and Illumination Sources

Several camera arrays are described above that incorporate cameras into the frame of an AR/VR/MR headset, camera arrays in accordance with many embodiments of the invention can utilize a number of cameras that are rigidly fixed within an AR/VR headset and one or more cameras and/or illumination sources that are removably attached to the AR/VR headset. In many embodiments, a mobile phone handset incorporating one or more cameras (or another removable component) and/or an illumination source can be inserted into a VR headset frame. By locking the mobile phone handset into place, the cameras incorporated within the handset can be aligned relative to the cameras in the VR headset frame to form a camera array. Processes similar to those described above can be used to determine the relative poses of the cameras and generate suitable calibration information for the use in depth estimation. AR/VR/MR headsets that incorporate camera arrays including at least one camera from a mobile phone handset and at least one camera cameras within the frame of the AR/VR/MR headset are discussed further below.

Figure 23:
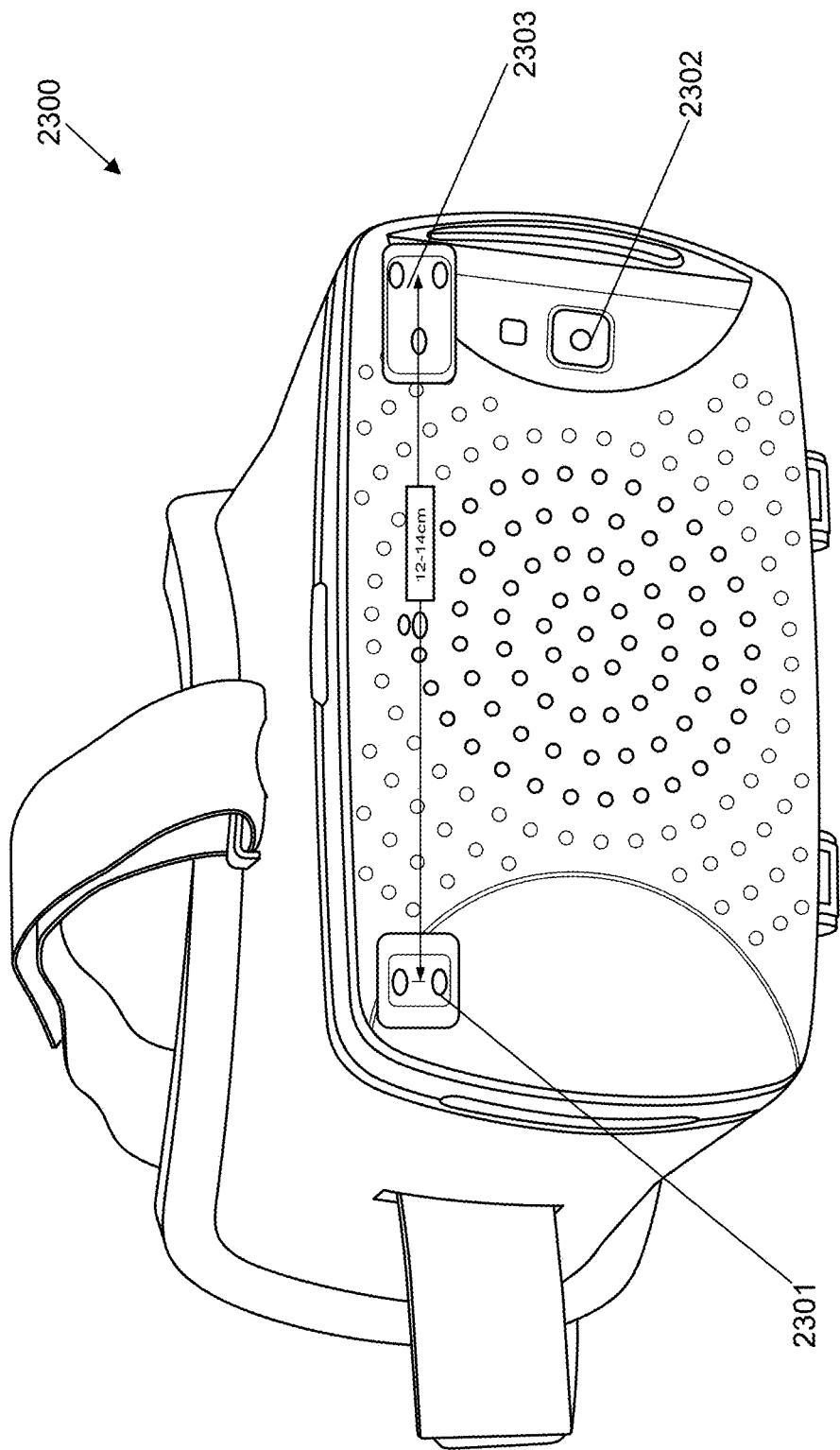
FIG. 23 illustrates a mobile phone handset incorporating a camera that acts as the reference camera of a camera array when combined with cameras incorporated within the frame of a VR headset in accordance with an embodiment of the invention.

A mobile phone handset incorporating a camera that acts as the reference camera of a camera array when combined with cameras incorporated within the frame of a VR headset in accordance with an embodiment of the invention is illustrated in FIG. 23. The headset 2300 includes a left subarray of cameras 2303, a right subarray of cameras 2303, and also a mounting for a mobile phone handset incorporating a reference camera 2302. As can readily be appreciated, the reference camera and the cameras in the subarrays incorporated within the headset can have the same imaging characteristics or different imaging characteristics depending upon the requirements of a specific application. The headset 2300 may use information obtained from the various cameras 2301-2303 for a variety of different applications, including computing depth maps from images of a scene captured by two or more of the cameras. In certain embodiments, the camera array includes an illumination source mounted within the headset 2300. In various embodiments, an illumination source may be utilized that is incorporated within removable component that is inserted within the headset 2300 (e.g. a mobile phone handset).

Although the discussion above of FIG. 23 references the camera of the mobile phone acting as the reference camera, any of a variety of removable components can be utilized to provide processing and/or imaging functionality to the headset. For example, certain embodiments may have an AR/MR device with a main camera in combination with a detachable camera array system that can be locked into place on the AR/MR device when the AR/MR application requires real-time depth computation. In addition, a camera that is incorporated within the headset can act as the reference camera and the depth maps can (optionally) be warped into the reference frame of the camera in the mobile phone handset, which in many instances primarily serves to capture color images of the scene. In addition, in some embodiments, the camera array may be a mobile phone that includes all of the cameras for determining depth and the mobile phone may be attached to a VR/AR/MR headset framework. As can readily be appreciated, the specific cameras and the utilization of the cameras in a camera array within a VR/AR/MR headset is largely determined by the requirements of a given application.

In some embodiments, the cameras in a VR headset may be used to alert the user of objects within the environment surrounding the user. In particular, many VR headsets completely immerse a user into a virtual environment such that the user is no longer able to see their surrounding environment. Accordingly, many embodiments use the cameras in the VR headset to provide the user with information regarding their surrounding environment, such as alerts if the user is about to collide with an obstacle, or if the user is leaving a certain area of a room.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method of estimating distances to objects within a scene from a set of images captured from different cameras in a set of cameras using a processor configured by an image processing application, the method comprising:
   generating an initial depth map of a scene;
   identify near-field and far-field portions of the scene;
   refine the depth map for the near-field portions of the scene using image data captured from a near-field set of cameras; and
   refine the depth map for the far-filed portions of the scene using image data captured from a far-field set of cameras, wherein a baseline distance between cameras in the near-field set of cameras is less than a baseline distance between cameras in the far-field set of cameras.

2. The method of claim 1, further comprising illuminating the scene using an illumination light source positioned within a threshold distance from a reference camera.

3. The method of claim 1, wherein the near-field portions of the scene are at a distance less than a certain threshold and the far-field portions of the scene are at a distance greater than the certain threshold.

4. The method of claim 1, wherein each camera in the set of cameras has the same imaging properties.

5. The method of claim 1, where the set of cameras have different field of views.

6. The method of claim 1, wherein the set of cameras have different resolutions.

7. The method of claim 1, wherein the set of cameras image in different portions of a light spectrum.

8. The method of claim 1, wherein the set of cameras are monochrome cameras with a same field of view and resolution.

9. The method of claim 8, wherein the monochrome cameras image across at least a portion of the visible spectrum and at least a portion of the near-infrared (near-IR) spectrum.

10. The method of claim 1, further comprising using the depth map in order to determine where to render an object on a display of a virtual reality (VR) application such that the object is appropriately occluded by a real world object also being displayed within the VR application.

11. The method of claim 1, further comprising using the depth map in order to determine where to render an object on a display of an augmented reality (AR) application such that the object is appropriately occluded by a real world object visible through a transparent display within the AR application.

12. The method of claim 1, wherein the set of cameras are mounted within a headset that includes a display via which images can be displayed.

13. The method of claim 12, wherein a reference camera and the display are part of a removable component that is mounted within the headset.

14. A non-transitory machine readable medium containing processor instructions for estimating distances to objects within a scene from a set of images captured from different cameras in a set of cameras, where execution of the instructions by a processor causes the processor to perform a process that comprises:
  generating an initial depth map of a scene;
  identify near-field and far-field portions of the scene;
  refine the depth map for the near-field portions of the scene using image data captured from a near-field set of cameras; and
  refine the depth map for the far-filed portions of the scene using image data captured from a far-field set of cameras, wherein a baseline distance between cameras in the near-field set of cameras is less than a baseline distance between cameras in the far-field set of cameras.

15. The non-transitory machine readable medium of claim 14, further comprising illuminating the scene using an illumination light source positioned within a threshold distance from a reference camera.

16. T The non-transitory machine readable medium of claim 14, wherein the near-field portions of the scene are at a distance less than a certain threshold and the far-field portions of the scene are at a distance greater than the certain threshold.

17. The non-transitory machine readable medium of claim 14, wherein each camera in the set of cameras has the same imaging properties.

18. The non-transitory machine readable medium of claim 14, where the set of cameras have different field of views.

19. The non-transitory machine readable medium of claim 14, wherein the set of cameras have different resolutions.

* * * * *